US009755243B2

(12) United States Patent
Mashio et al.

(10) Patent No.: US 9,755,243 B2
(45) Date of Patent: Sep. 5, 2017

(54) ELECTRODE CATALYST LAYER FOR FUEL CELLS, ELECTRODE FOR FUEL CELLS, MEMBRANE ELECTRODE ASSEMBLY FOR FUEL CELLS, AND FUEL CELL

(75) Inventors: Tetsuya Mashio, Yokohama (JP); Atsushi Ohma, Yokohama (JP); Yoshitaka Ono, Yokohama (JP); Hiroshi Iden, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 159 days.

(21) Appl. No.: 14/240,653

(22) PCT Filed: Aug. 14, 2012

(86) PCT No.: PCT/JP2012/070659
§ 371 (c)(1),
(2), (4) Date: Feb. 24, 2014

(87) PCT Pub. No.: WO2013/027627
PCT Pub. Date: Feb. 28, 2013

(65) Prior Publication Data
US 2014/0205929 A1 Jul. 24, 2014

(30) Foreign Application Priority Data
Aug. 25, 2011 (JP) .................. 2011-183654

(51) Int. Cl.
*H01M 4/86* (2006.01)
*B01J 23/42* (2006.01)
(Continued)

(52) U.S. Cl.
CPC ........... *H01M 4/8663* (2013.01); *B01J 23/42* (2013.01); *B01J 35/0033* (2013.01);
(Continued)

(58) Field of Classification Search
None
See application file for complete search history.

(56) References Cited

U.S. PATENT DOCUMENTS 6,746,793 B1   6/2004  Gyoten et al.
2003/0198849 A1*  10/2003  Hampden-Smith ...... B01J 21/18
                                                     429/483

(Continued)

FOREIGN PATENT DOCUMENTS

EP    2626935 A1    8/2013
JP    2006286329 A  10/2006
(Continued)

OTHER PUBLICATIONS

Communication and extended European search report dated Dec. 9, 2014, from the corresponding European Patent Application No. 12825657.5.

*Primary Examiner* — Lucas J. O'Donnell
(74) *Attorney, Agent, or Firm* — Young Basile Hanlon & MacFarlane, P.C.

(57) ABSTRACT

This electrode catalyst layer for fuel cells is provided with: an electrode catalyst that comprises a conductive carrier and platinum-containing metal particles supported on the surface of the conductive carrier; and an ionomer that covers the electrode catalyst. This electrode catalyst layer for fuel cells is characterized in that the average thickness of the ionomer is 2.4 nm or less. This electrode catalyst layer for fuel cells is capable of having a good balance between proton transport properties and transport properties for a gas such as an oxidant gas or a fuel gas even in cases where the amount of supported platinum is decreased. In addition, an electrode for fuel cells, a membrane electrode assembly for fuel cells, and a fuel cell, each having good current-voltage characteristics, can be obtained using the above-described electrode catalyst layer for fuel cells.

12 Claims, 16 Drawing Sheets

(51) Int. Cl.
*H01M 4/92* (2006.01)
*B01J 35/00* (2006.01)
*H01M 8/1007* (2016.01)
*H01M 8/1018* (2016.01)

(52) U.S. Cl.
CPC ....... *B01J 35/0053* (2013.01); *H01M 4/8605* (2013.01); *H01M 4/8668* (2013.01); *H01M 4/92* (2013.01); *H01M 4/925* (2013.01); *H01M 8/1007* (2016.02); *H01M 2008/1095* (2013.01)

(56) References Cited

U.S. PATENT DOCUMENTS

| | | | | |
|---|---|---|---|---|
| 2004/0131919 | A1* | 7/2004 | Yasumoto | H01M 4/8605 429/490 |
| 2004/0248730 | A1* | 12/2004 | Kim | B01J 23/40 502/185 |
| 2007/0238001 | A1* | 10/2007 | Koyama | H01B 1/122 429/480 |
| 2010/0227249 | A1* | 9/2010 | Kawamura | H01M 4/8605 429/483 |
| 2010/0323271 | A1 | 12/2010 | Araki et al. | |
| 2011/0200916 | A1 | 8/2011 | Morinaga | |

FOREIGN PATENT DOCUMENTS

| | | | |
|---|---|---|---|
| JP | 2006294594 | A | 10/2006 |
| JP | 2009295341 | A | 12/2009 |
| JP | 2011113884 | A | 6/2011 |
| JP | 2011159586 | A | 8/2011 |

* cited by examiner

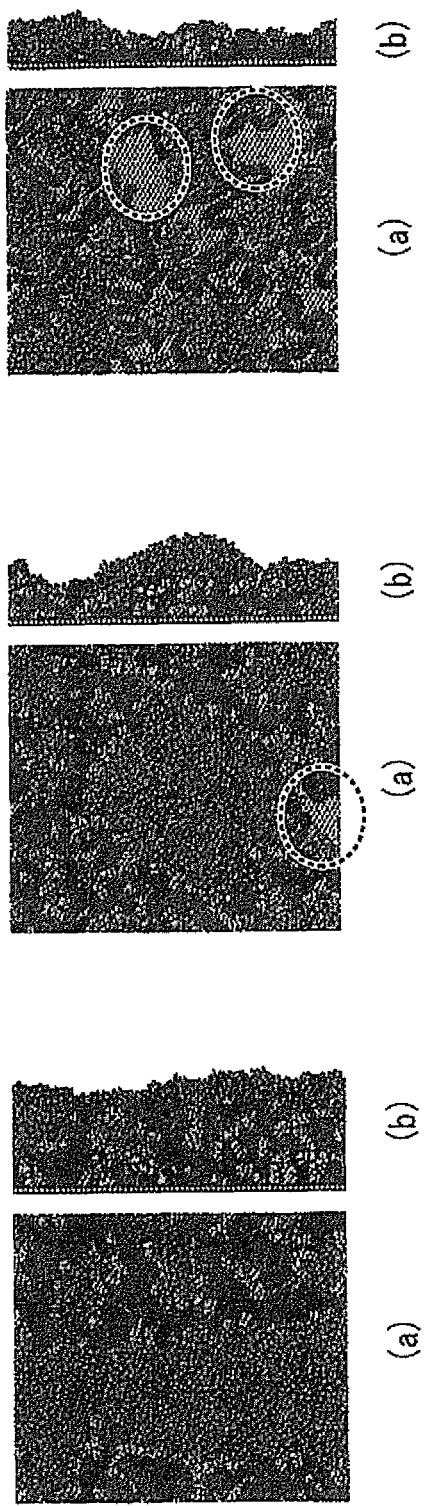

ELECTRODE CATALYST LAYER FOR FUEL CELLS, ELECTRODE FOR FUEL CELLS, MEMBRANE ELECTRODE ASSEMBLY FOR FUEL CELLS, AND FUEL CELL

CROSS REFERENCE TO RELATED APPLICATION

The present application claims priority to Japanese Patent Application No. 2011-183654, filed Aug. 25, 2011, each incorporated herein in its entirety.

TECHNICAL FIELD

The present invention relates to a fuel cell electrode catalyst layer, a fuel cell electrode, a fuel cell membrane electrode assembly and a fuel cell. More particularly, the present invention relates to a fuel cell electrode catalyst layer, a fuel cell electrode, a fuel cell membrane electrode assembly and a fuel cell that, even when the platinum supporting amount is reduced, can satisfy both of a transportability of gas such as oxidant gas and fuel gas and a proton transportability to achieve good current-voltage characteristics. Such fuel cells can be applied, for example, to vehicles etc. As such fuel cells, for example, a polymer electrolyte fuel cell (PEFC) can be mentioned.

BACKGROUND

The polymer electrolyte fuel cell generally has a structure, in which a plurality of single cells exerting a power generation function is stacked. Each of the single cells has a polymer electrolyte membrane and a membrane electrode assembly (MEA). The MEA includes a pair of electrode catalyst layers sandwiching the polymer electrolyte membrane from an anode side and a cathode side. Examples of the polymer electrolyte membranes include Nafion™ (manufactured by Du Pont). Further, each of the single cells may additionally have a membrane electrode gas diffusion layer assembly that includes a pair of gas diffusion layers (GDL) for sandwiching the membrane electrode assembly and dispersing supply gas on each of the anode side and the cathode side. Then, the membrane electrode assembly and the membrane electrode gas diffusion layer assembly owned by an individual single cell are electrically connected to the membrane electrode assembly and the membrane electrode gas diffusion layer assembly of another neighboring single cell via a separator. By the stacking and connection of the single cells in this way, a fuel cell stack is constituted. The fuel cell stack can function as a power generator usable for various applications.

A power generation mechanism of a polymer electrolyte fuel cell will be explained briefly. In the operation of the polymer electrolyte fuel cell, fuel gas such as hydrogen gas is supplied to the anode side of the single cell, and oxidant gas such as air or oxygen is supplied to the cathode side. As the result, in each of the anode and the cathode, electrochemical reactions shown by the following reaction formulae (1) and (2), progress to generate electricity.

$$H_2 \rightarrow 2H^+ + 2e^-  \quad (1)$$

$$2H^+ + 2e^- + (1/2)O_2 \rightarrow H_2O \quad (2)$$

As a catalyst component for accelerating electrochemical reactions shown by the above-mentioned reaction formulae (1) or (2), generally, platinum is used.

As shown in Japanese Patent Application Laid-Open Publication No. 2009-295341, there is proposed a membrane electrode assembly for a purpose of improving durability of the membrane electrode assembly under the low temperature environment and low-temperature startability of a fuel cell. The membrane electrode assembly is a membrane electrode assembly in which a catalyst electrode is assembled on both sides of the electrolyte membrane, and at least one catalyst electrode includes a first and a second catalyst layer containing a catalyst, carbon and an ionomer. The weight ratio of the ionomer relative to the carbon in the second catalyst layer is from 0.4 to 0.75.

SUMMARY OF INVENTION

In the membrane electrode assembly and the fuel cell described in Patent Literature 1, by adjusting the weight ratio of the ionomer relative to the carbon, a porosity of secondary pores that are blocked caused by generated water frozen in the catalyst layer is controlled. Consequently, durability and low-temperature startability under low temperature environment, for example, degrees below zero are improved. In the membrane electrode assembly and the fuel cell described in Patent Literature 1, however, nothing is examined on the catalyst amount and the ionomer thickness in the catalyst layer.

However, as the result of the examination particularly on the catalyst amount, it became clear that, for example, when a catalyst amount was large because an effective surface area of platinum was large or the catalyst layer was thick etc., the gas transportability deteriorated and voltage dropped.

The present invention was accomplished in order to solve the above-mentioned problem. That is, the present invention aims at providing a fuel cell electrode catalyst layer that, even when the platinum supporting amount is reduced, satisfies both of the transportability of gas such as oxidant gas and fuel gas and the proton transportability to achieve good current-voltage characteristics. Furthermore, it aims at providing a fuel cell electrode, a fuel cell membrane electrode assembly and a fuel cell using the fuel cell electrode catalyst layer.

The fuel cell electrode catalyst layer according to an aspect of the present invention includes an electrode catalyst having a conductive support and a platinum-containing metal particle supported on the surface of the conductive support, and an ionomer covering the electrode catalyst. Further, it is characterized in that the average thickness of the ionomer is 2.4 nm or less.

The fuel cell electrode according to an aspect of the present invention is characterized by having the above-mentioned fuel cell electrode catalyst layer of the present invention.

The fuel cell membrane electrode assembly according to an aspect of the present invention is characterized by having the above-mentioned fuel cell electrode of the present invention.

The fuel cell according to an aspect of the present invention is characterized by including the above-mentioned fuel cell membrane electrode assembly of the present invention.

BRIEF DESCRIPTION OF DRAWINGS

The description herein makes reference to the accompanying drawings wherein like reference numerals refer to like parts throughout the several views, and wherein:

FIGS. 11A-11C are drawings that explains the analytical result of a covering structure of the ionomer in FIG. 10, based on the molecular dynamics, each of FIGS. 11A-11C shown in a plan view (a) and a cross-sectional view (b), with FIG. 11A corresponding to the case where the average thickness of the ionomer is 4.0 nm, FIG. 11B corresponding to the case where the average thickness of the ionomer is 2.0 nm, and FIG. 11C corresponding to the case where the average thickness of the ionomer is 1.0 nm;

DESCRIPTION OF EMBODIMENTS

Figure 1:
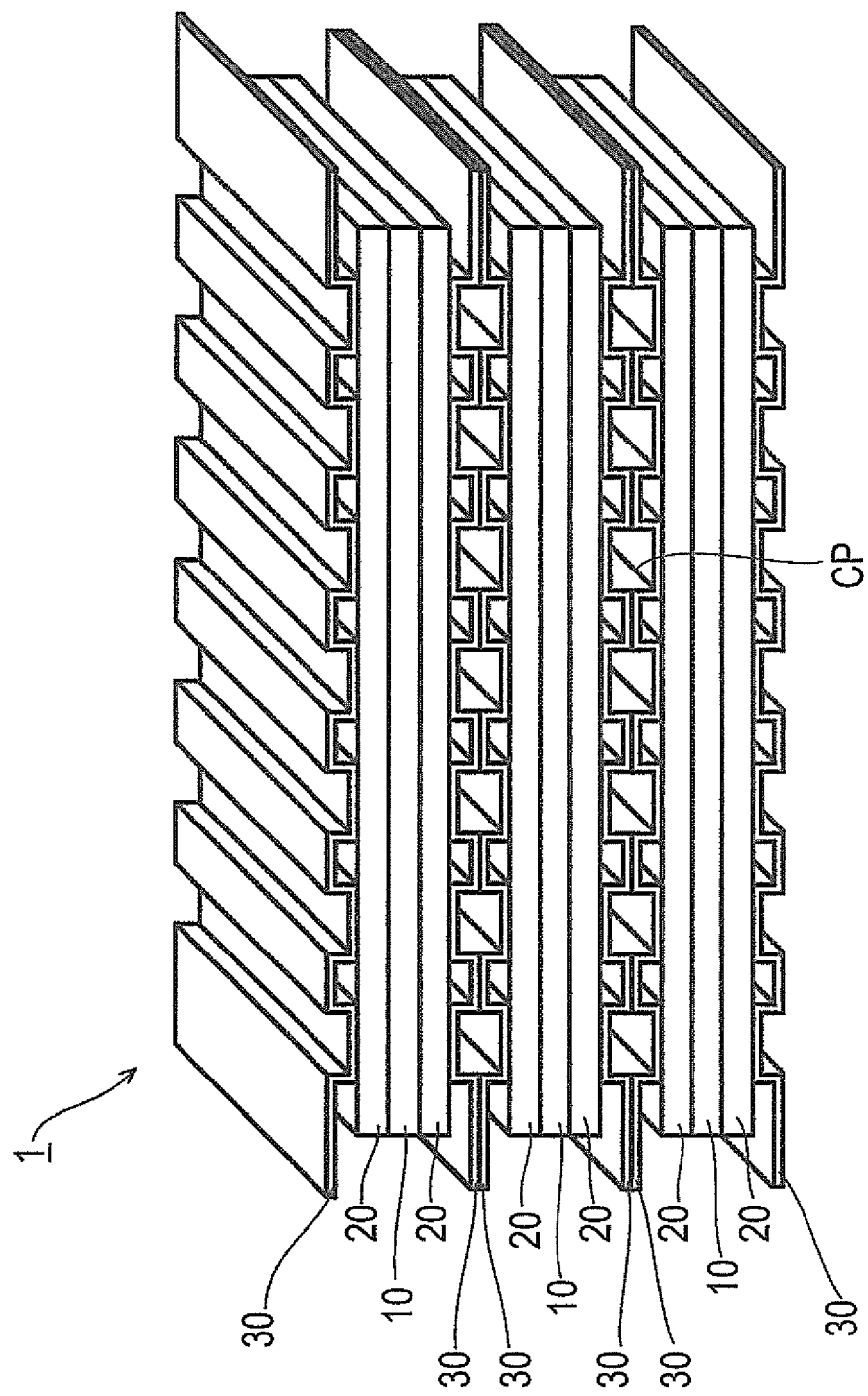
FIG. 1 is a perspective view showing the outline of a stack of a polymer electrolyte fuel cell that is a representative example of the fuel cell according to an embodiment of the present invention.

Hereinafter, the fuel cell electrode catalyst layer, the fuel cell electrode, the fuel cell membrane electrode assembly and the fuel cell according to an embodiment of the present invention will be described in detail while referring to the drawings. Meanwhile, dimensional ratios in drawings referred to in the following embodiment are exaggerated for convenience of explanation, and may be different from an actual ratio.

Figure 2:
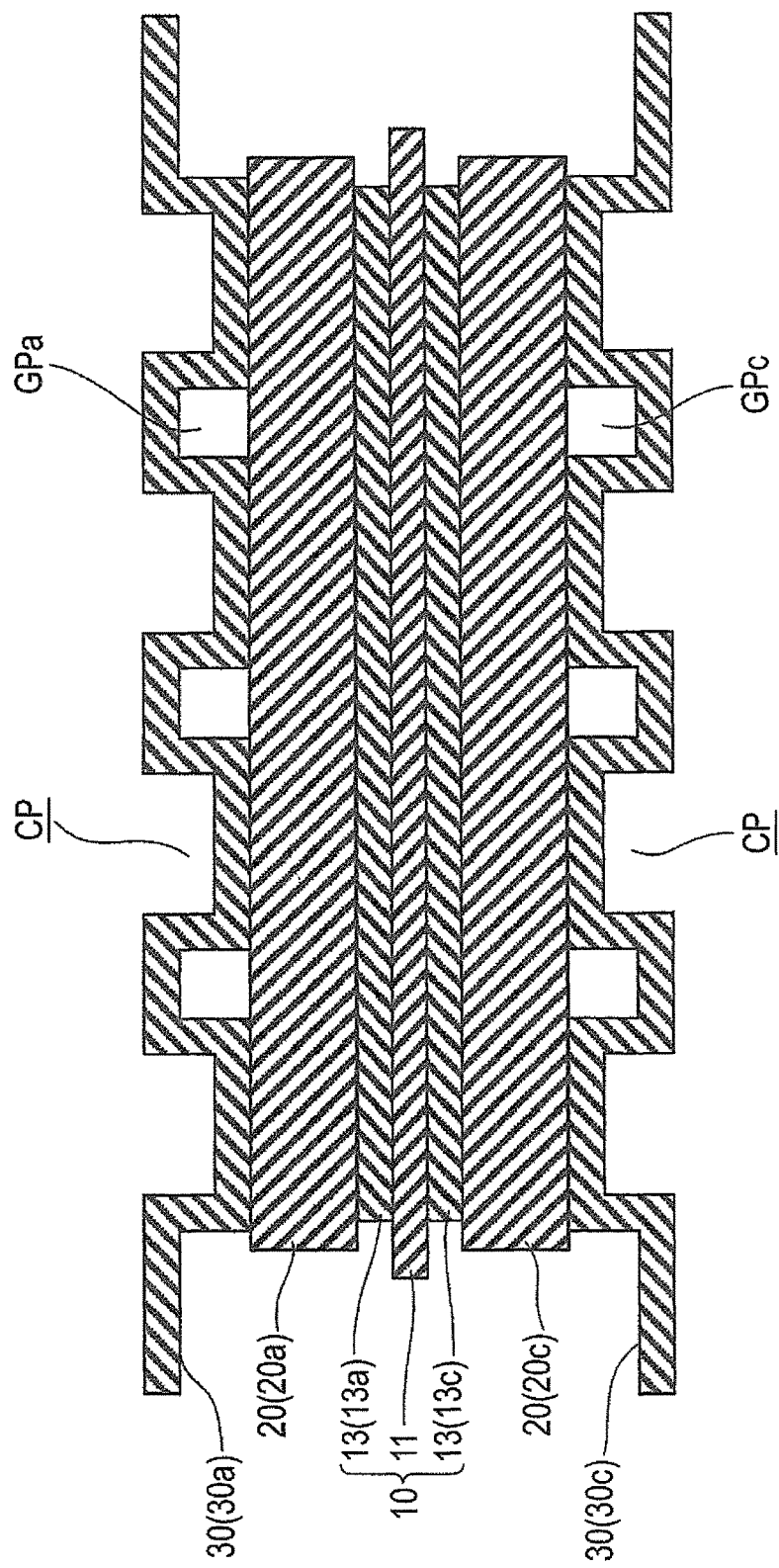
FIG. 2 is a cross-sectional view showing schematically a basic configuration of the polymer electrolyte fuel cell that is the representative example of the fuel cell according to the embodiment of the present invention.

FIG. 1 is a perspective view showing the outline of a stack of a polymer electrolyte fuel cell that is a representative example of the fuel cell according to the embodiment of the present invention. Moreover, FIG. 2 is a cross-sectional view showing schematically a basic configuration of the polymer electrolyte fuel cell that is the representative example of the fuel cell according to the embodiment of the present invention. Further, FIG. 3 is a cross-sectional view showing schematically a configuration of an electrode catalyst layer of the polymer electrolyte fuel cell that is the representative example of the fuel cell according to the embodiment of the present invention.

As shown in FIG. 1, in the present embodiment, a fuel cell (stack) 1 includes a membrane electrode assembly 10, a pair of gas diffusion layers (GDL) 20 that sandwiches the membrane electrode assembly 10, and a pair of separators 30 that sandwiches the membrane electrode assembly 10 and the gas diffusion layers 20. Meanwhile, each of the pair of GDLs 20 and the pair of separators 30 makes a pair on the anode side and cathode side. In the fuel cell (stack), the membrane electrode assembly exerts a power generation function, and the gas diffusion layers disperse supply gas. The separators separate fuel gas and oxidant gas each other, which are to be supplied to the anode and the cathode, and connects electrically neighboring membrane electrode assemblies each other. As the membrane electrode assemblies are stacked and connected as described above, the fuel cell stack is constituted. Meanwhile, in the fuel cell (stack), between the separator and a solid polymer electrolyte membrane to be described later, and between the membrane electrode assembly and another neighboring membrane electrode assembly, a gas seal part is disposed, but, in FIG. 1 and in FIG. 2 to be described later, illustration of these is omitted. Further, in the fuel cell (stack), a manifold, which functions as a coupler for coupling respective cells when the stack is constituted, is disposed, but, in FIG. 1, illustration of these is omitted.

Further, as shown in FIG. 2, in the present embodiment, the membrane electrode assembly 10 includes a polymer electrolyte membrane 11, and a pair of electrode catalyst layers 13 that sandwiches the polymer electrolyte membrane 11. The electrode catalyst layers 13 may be called an anode electrode catalyst layer 13a and a cathode electrode catalyst layer 13c. Further, the membrane electrode assembly 10 is sandwiched by the pair of gas diffusion layers (GDL) 20. The gas diffusion layers 20 may be called an anode gas diffusion layer 20a and a cathode gas diffusion layer 20c. Furthermore, the membrane electrode assembly 10 and the gas diffusion layers 20 are sandwiched by the pair of separators 30. The separators 30 may be called an anode separator 30a and a cathode separator 30c. The separator 30 has a concave-convex shape as shown in FIG. 1. The convex part of the separator (30a or 30c) seen from the membrane electrode assembly 10 side is in contact with the gas diffusion layer 20. Consequently, electric connection with the membrane electrode assembly 10 is assured. Furthermore, the concave part of the separator (30a or 30c) seen from the membrane electrode assembly 10 side functions as a gas flow path (GPa or GPc) for making gas flow in the operation of the fuel cell (stack) 1. Meanwhile, the above-mentioned concave part corresponds to a space between the separator 30 and the gas diffusion layer 20, which is generated caused by the concave-convex shape owned by the separator. Specifically, through the gas flow path GPa of the anode separator 30a, fuel gas such as hydrogen is made to flow, and, through the gas flow path GPc of the cathode separator 30c, oxidant gas such as oxygen or air is made to flow. On the other hand, the concave part of the separator (30a or 30c) seen from the side opposite to the membrane electrode assembly 10 side functions as a coolant flow path CP for making a coolant such as water flow in order to cool the fuel cell (stack) in the operation of the fuel cell (stack) 1. Meanwhile, in the present invention, one that includes only the above-mentioned electrode catalyst layer, and one that is constituted by forming the electrode catalyst layer on the above-mentioned gas diffusion layer are called the fuel cell electrode.

Figure 3:
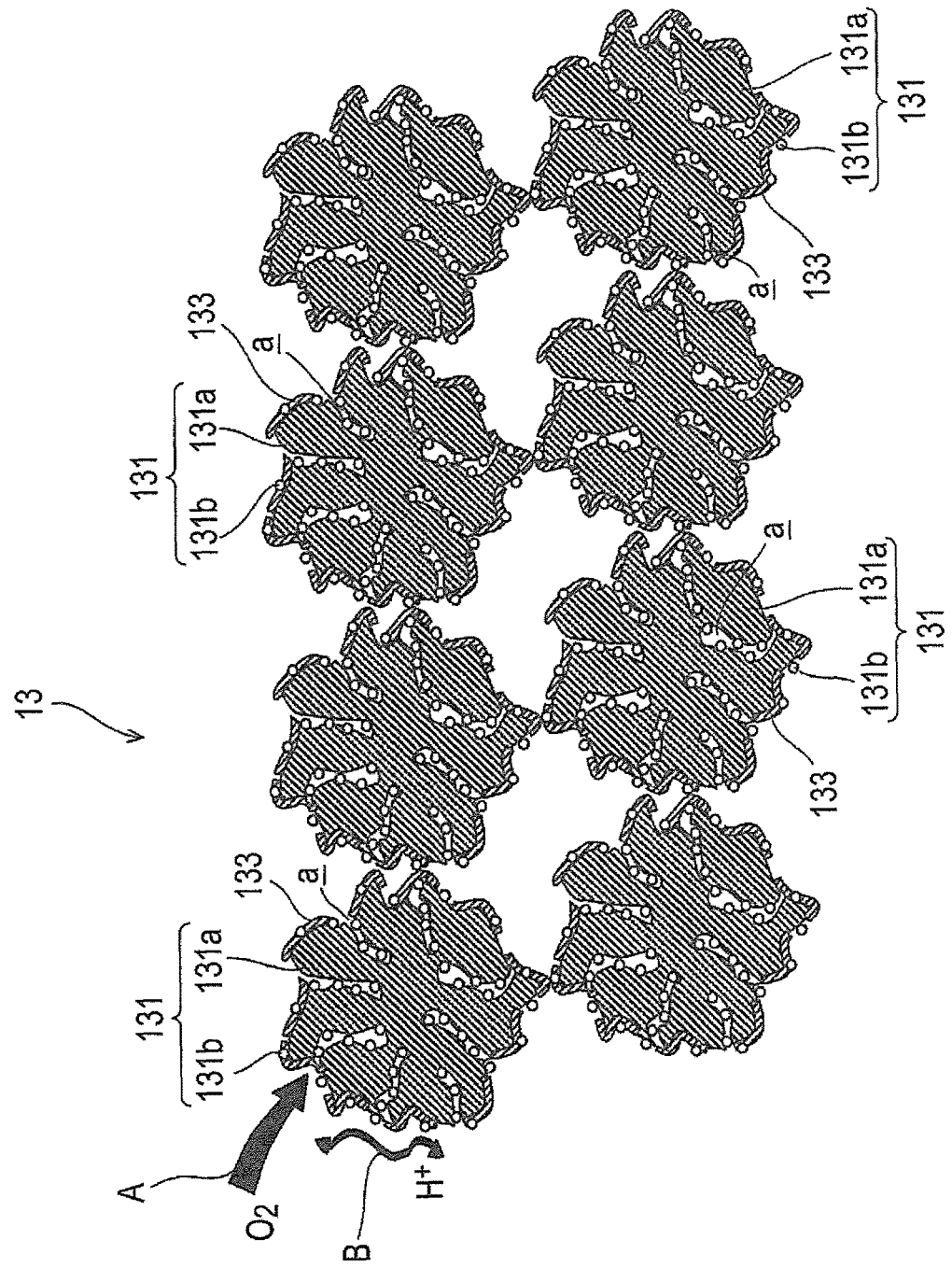
FIG. 3 is a cross-sectional view showing schematically a configuration of an electrode catalyst layer of the polymer electrolyte fuel cell that is the representative example of the fuel cell according to an embodiment of the present invention.

Furthermore, as shown in FIG. 3, the electrode catalyst layer 13 according to the present embodiment includes an electrode catalyst 131 that has a conductive support 131a and a metal particle 131b containing platinum supported on the surface of the conductive support 131a, and an ionomer 133 covering the electrode catalyst 131. In the present embodiment, the conductive support 131a has a primary pore "a". Meanwhile, arrows A and B in the drawing show, respectively, movement (flow) of oxygen gas and a proton when the electrode catalyst layer 13 is the cathode electrode catalyst layer 13c. The electrode catalyst layer of the present embodiment has high effect and is suitable when it is used as a cathode electrode catalyst layer, but it is not limited to this. For example, it can be used also as an anode electrode catalyst layer. Furthermore, in the present invention, the phrase "a metal particle containing platinum" shall be construed as a meaning that includes also a platinum particle itself. In the present embodiment, it is preferable to apply one having a primary pore as a conductive support, but it is not limited to this. That is, although not shown, one having no primary pore can also be applied. Meanwhile, the primary pore "a" represents a space that the electrode catalyst 131 has inside the particle, and, although not shown, the secondary pore represents a space formed between electrode catalyst particles.

Moreover, the average thickness of the ionomer in the present embodiment is 2.4 nm or less. Meanwhile, in order to exert better current-voltage characteristics even when the platinum supporting amount is furthermore reduced, it is preferably 2.0 nm or less, more preferably 1.7 nm or less.

As the result of having such configuration, the fuel cell electrode catalyst layer of the present embodiment can, even when the platinum supporting amount is reduced, satisfy both of the improvement of the transportability of gas such as oxidant gas and fuel gas and that of the proton transportability. As the result, good current-voltage characteristics can be exerted. Furthermore, the same may be said of the fuel cell electrode, the fuel cell membrane electrode assembly and the fuel cell to which this fuel cell electrode catalyst layer is applied. That is, even when the platinum supporting amount is reduced, both of the improvement of the transportability of gas such as oxidant gas and fuel gas and that of the proton transportability are satisfied, and good current-voltage characteristics can be exerted.

The effective surface area of platinum in the present embodiment is preferably 120 $cm^2 \cdot cm^{-2}$ or less. Further, in order to exert good current-voltage characteristics even when the platinum supporting amount is furthermore reduced, 100 $cm^2 \cdot cm^{-2}$ or less is preferable. However, the present invention is not limited to be in such suitable numerical range.

Here, the effective surface area of platinum and the average thickness of an ionomer will be explained. First, the phrase "effective surface area of platinum ($S_{pt}^{eff}$ [$cm^2 \cdot cm^{-2}$])" is represented by the following formula [1], which uses the amount of platinum contained in a fuel cell electrode catalyst layer (m [$mg_{pt} \cdot cm^{-2}$]) and an electrochemical surface area ($s^{eff}$ [$m^2 \cdot g_{pt}^{-1}$]). Meanwhile, the electrochemical surface area can be obtained from the amount of electricity corresponding to the amount of hydrogen adsorbed or the amount of CO adsorbed in cyclic voltammetry, which is a general technique.

$$S_{pt}^{eff} = m \times s^{eff} \qquad \text{[Formula 1]}$$

Next, the phrase "average thickness of the ionomer (t_ionomer [nm])" is represented by the following formula [2].

$$t\_ionomer = w/\rho/(S \times \theta \times 10000) \times 10^7 \qquad \text{[Formula 2]}$$

Here, w [-] is a mass ratio of the ionomer relative to a conductive support, which is represented by $g\_ionomer/g\_support$. $\rho$[$g\_ionomer/cm^3$] is a dry density of the ionomer. S [$m^2/g\_support$] is a nitrogen ($N_2$) BET specific surface area of the conductive support. $\theta$ [-] is the ratio between $C_{dl}$ under a low humidification condition and $C_{dl}$ under a high humidification condition, which is determined when dependency of supply gas on relative humidity (RH) is evaluated. Meanwhile, the low humidification means a humidity condition of RH 30% or less, which may be abbreviated as "dry" from now on. The high humidification means a humidity condition of RH 100%. That is, $\theta$ [-] is represented by $C_{dl\_dry}/C_{dl\_RH\ 100\%}$. Here, $C_{dl}$ represents the electric double layer capacitance of a fuel cell catalyst layer that is measured using a fuel cell membrane electrode assembly having a fuel cell catalyst layer formed as a mixed body containing a conductive support and an ionomer.

Meanwhile, the dependency of the electric double layer capacitance ($C_{dl}$) in a fuel cell catalyst layer on relative humidity of supply gas is evaluated as follows. That is, a low humidification condition is defined as relative humidity of 30%, and a high humidification condition is defined as relative humidity of 100%, and the ratio of electric double layer capacitances under these conditions is used. The reason thereof is as follows.

Figure 4:
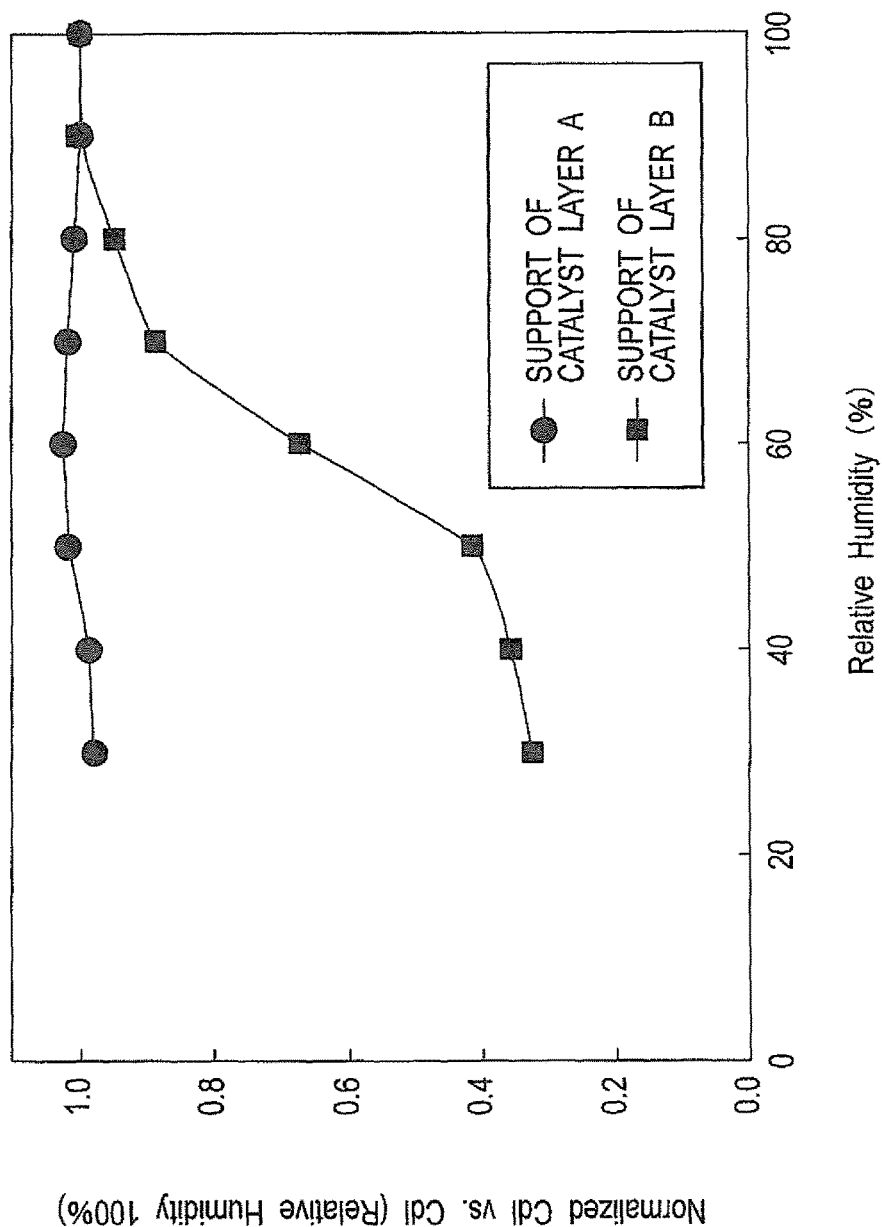
FIG. 4 is a graph showing dependency of electric double layer capacitance ($C_{dl}$) of a fuel cell catalyst layer on relative humidity (RH) of supply gas, which was measured using a fuel cell membrane electrode assembly having fuel cell electrode catalyst layers A and B.

Under the high humidification condition, an electric double layer formed at the interface between the conductive support and water adsorbed on the surface of the conductive support, or at the interface between the conductive support and the ionomer is observed. On the other hand, under the low humidification condition, an electric double layer formed at the interface between the conductive support and the ionomer is mainly observed. FIG. 4 is a graph showing the dependency of electric double layer capacitance ($C_{dl}$) in a fuel cell catalyst layer on relative humidity (RH) of supply gas, which was measured using a fuel cell membrane electrode assembly having fuel cell electrode catalyst layers A and B. Meanwhile, the fuel cell electrode catalyst layer A is formed using a graphitized Ketjenblack (GKB) support, and has a nitrogen BET specific surface area of 151 $m^2/g$. The fuel cell electrode catalyst layer B is formed using Ketjenblack (KB) support, and has a nitrogen BET specific surface area of 718 $m^2/g$. As the ionomer, Nafion having a dry density of 1.91 $g/cm^3$ was used, and, as the metal particle, a platinum particle was used. From FIG. 4, it is suggested that the electric double layer capacitance is approximately constant at relative humidity of 30% or less. Accordingly, in the present invention, relative humidity of 30% and relative humidity of 100% were determined, respectively, as the representative points of the low humidification condition and the high humidification condition. Further, the ratio between electric double layer capacitances under both conditions is calculated to define an index for evaluating to what degree the conductive support is covered with the ionomer.

Furthermore, when the effective surface area of platinum exceeds 120 $cm^2 \cdot cm^{-2}$, no such problem is generated that the influence of the gas transportability in a transportation path of gas such as oxygen passing through the ionomer becomes obvious to lower a voltage. Meanwhile, the gas transportation path is a transportation path of gas such as oxygen toward a metal particle containing platinum existing on the surface or in the primary pore of the conductive support. Accordingly, for example, the effect obtained by thinning the average thickness of the ionomer to 2.4 nm or less does not appear.

On the other hand, when the effective surface area of platinum is 120 $cm^2 \cdot cm^{-2}$ or less, the transport resistance of gas such as oxygen inside the electrode catalyst layer increases remarkably. On this occasion, the influence of the gas transportability in the transportation path of gas passing through the ionomer becomes obvious. That is, the gas transport resistance in the ionomer is rate-limiting factor. However, even in this case, by setting the average thickness of the ionomer to be 2.4 nm or less, the transportability of gas such as oxygen passing through the ionomer in a gas transportation path is improved. Although a proton transportability lowers slightly as the thickness of the ionomer is made thinner, the influence thereof does not become actual. Accordingly, even when the platinum supporting amount is reduced, the improvement of the transportability of gas such as oxidant gas and fuel gas and that of the proton transportability are achieved simultaneously, and good current-voltage characteristics can be exerted.

Moreover, when an electrode catalyst layer is applied to the anode side, from the viewpoint of suppressing voltage drop, the effective surface area of platinum in the present embodiment is preferably 5 $cm^2 \cdot cm^{-2}$ or more. However, the present invention is not limited to be in such suitable numerical range. Furthermore, from the viewpoint of assuring a binding function by the ionomer between the conductive support and the electrode catalyst in the electrode catalyst layer, the average thickness of the ionomer in the present embodiment is preferably 0.9 nm or more. However, the present invention is not limited to be in the suitable numerical range.

In general, when a platinum effective surface area is small, a catalyst layer is thin, or the like, obviously, the amount of a catalyst contained is small. From the examination on such a case, it was recognized that the porosity in the catalyst layer controlled in the membrane electrode assembly and the fuel cell described in Patent Literature 1 gave almost no influence on the voltage. It was recognized furthermore that, in this case, the influence of the gas transportability in the transportation path of gas passing through the ionomer became actual to lower the voltage. To the gas transportation path, in particular, a transportation path that transports oxygen and runs toward the catalyst lying in the primary pore or on the surface of the support corresponds.

Figure 5:
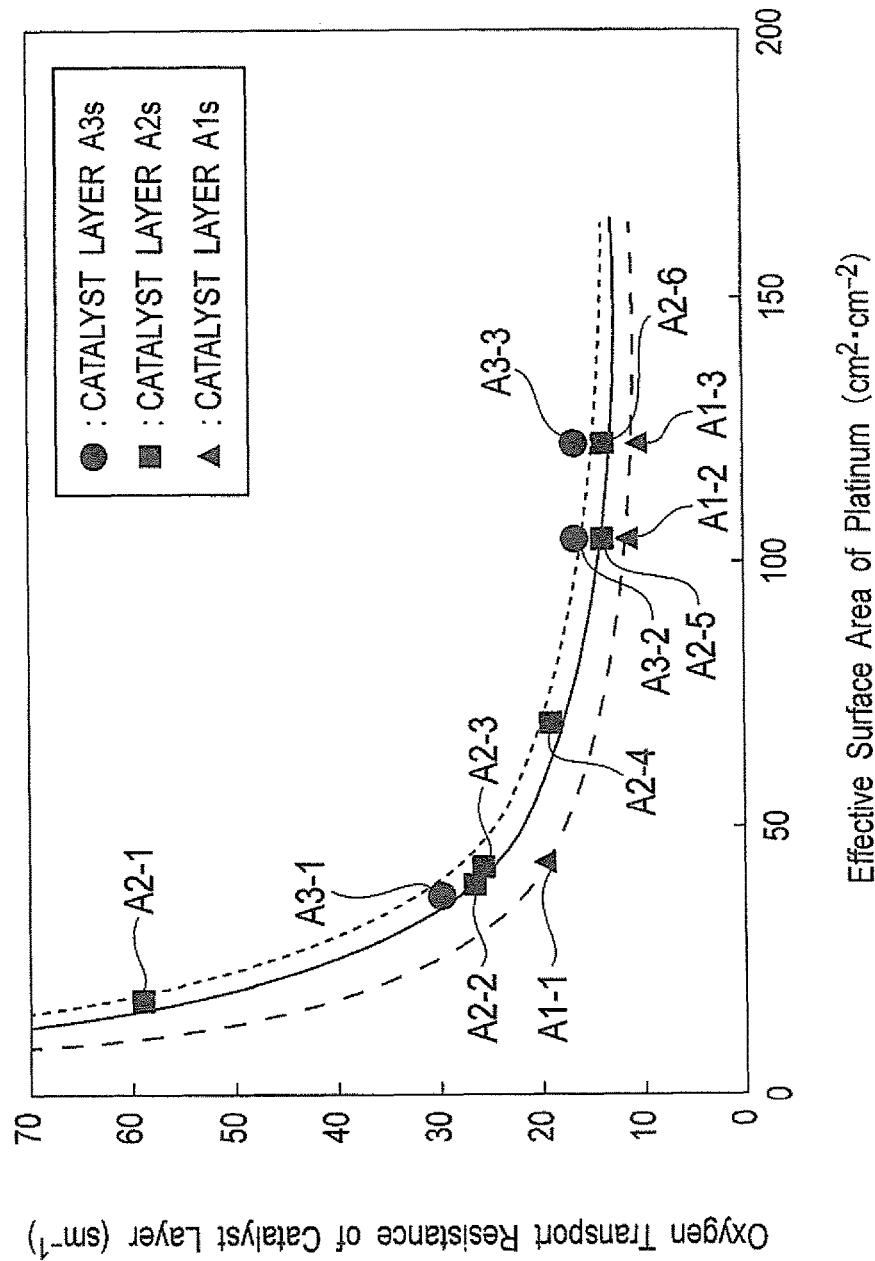
FIG. 5 is a graph showing the relationship between a platinum effective surface area and oxygen transport resistance of an electrode catalyst layer when an electrode catalyst layer A (A1s, A2s, A3s) is used.

FIG. 5 is a graph showing the relationship between the platinum effective surface area and the oxygen transport resistance of an electrode catalyst layer when an electrode catalyst layer A (A1s, A2s or A3s) is used. Meanwhile, the A1s has an ionomer average thickness of 2.4 nm, the A2s has an ionomer average thickness of 3.2 nm, and the A3s has an ionomer average thickness of 4.6 nm. Meanwhile, as to the value of the platinum effective surface area, A3-1 had 38 $cm^2 \cdot cm^{-2}$, and A1-1 had 43 $cm^2 \cdot cm^{-2}$. Further, each of A1-2, A2-5 and A3-2 had 104 $cm^2 \cdot cm^{-2}$. Furthermore, each of A1-3, A2-6 and A3-3 had 123 $cm^2 \cdot cm^{-2}$.

Figure 6:
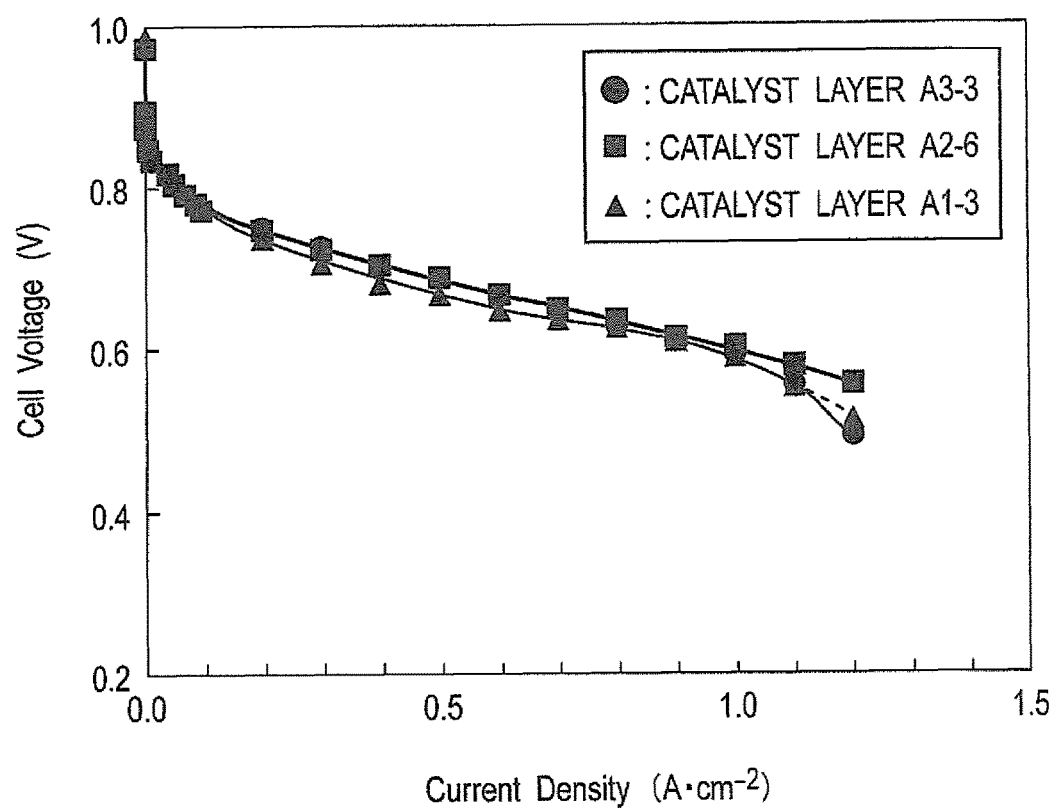
FIG. 6 is a graph showing current-voltage characteristics when an electrode catalyst layer A (A1-3, A2-6, A3-3) is used.

FIG. 6 is a graph showing current-voltage characteristics when the electrode catalyst layer A1-3, A2-6 or A3-3 is used. Meanwhile, the A1-3 has a platinum effective surface area of 123 $cm^2 \cdot cm^{-2}$ and an ionomer average thickness of 2.4 nm, and the A2-6 has a platinum effective surface area of 123 $cm^2 \cdot cm^{-2}$ and an ionomer average thickness of 3.2 nm. The A3-3 has a platinum effective surface area of 123 $cm^2 \cdot cm^{-2}$ and an ionomer average thickness of 4.6 nm. As shown in FIG. 6, when the platinum effective surface area is large, the effect obtained by thinning the average thickness of the ionomer does not appear. Meanwhile, at this time, the above-mentioned mechanism is not clear, but the mechanism is considered that the improvement of the transportability of gas such as oxygen and the lowering of the proton transportability are cancelled each other, and current-voltage performance at the maximum current remains low. The above-mentioned mechanism is, however, based absolutely on supposition. Accordingly, needless to say, even if the above-mentioned effect is obtained by a mechanism other than the above-mentioned mechanism, it is included in the range of the present invention. Further, the same applies to mechanisms described below.

Figure 7:
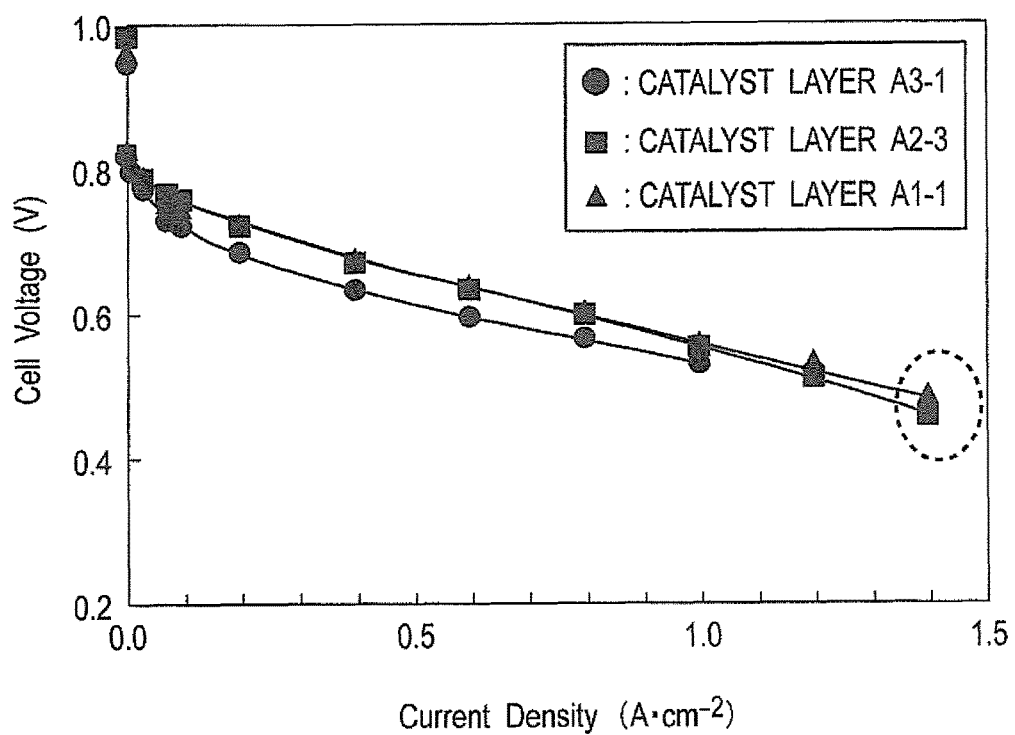
FIG. 7 is a graph showing current-voltage characteristics when an electrode catalyst layer A (A1-1, A2-3, A3-1) is used.

On the other hand, FIG. 7 is a graph showing current-voltage characteristics when the electrode catalyst layer A1-1, A2-3 or A3-1 is used. Meanwhile, the A1-1 has a platinum effective surface area of 43 $cm^2 \cdot cm^{-2}$ and an ionomer average thickness of 2.4 nm, the A2-3 has a platinum effective surface area of 42 $cm^2 \cdot cm^{-2}$ and an ionomer average thickness of 3.2 nm. The A3-1 has a platinum effective surface area of 38 $cm^2 \cdot cm^{-2}$ and an ionomer average thickness of 4.6 nm. As shown in FIG. 7, when the platinum effective surface area is small, the effect obtained by thinning the average thickness of the ionomer becomes obvious. Meanwhile, at this time, the above-mentioned mechanism is not clear, but the mechanism is so considered that the improvement of transportability of gas such as oxygen controls current-voltage characteristics and the influence of lowering of the proton transportability is small. Further, a cell voltage at the maximum current when the electrode catalyst layer A1-1 is applied is 485 mV, and a cell voltage when the electrode catalyst layer A3-1 is applied is 452 mV. Therefore, it is recognized that current-voltage performance is improved by 7.3%.

Figure 8:
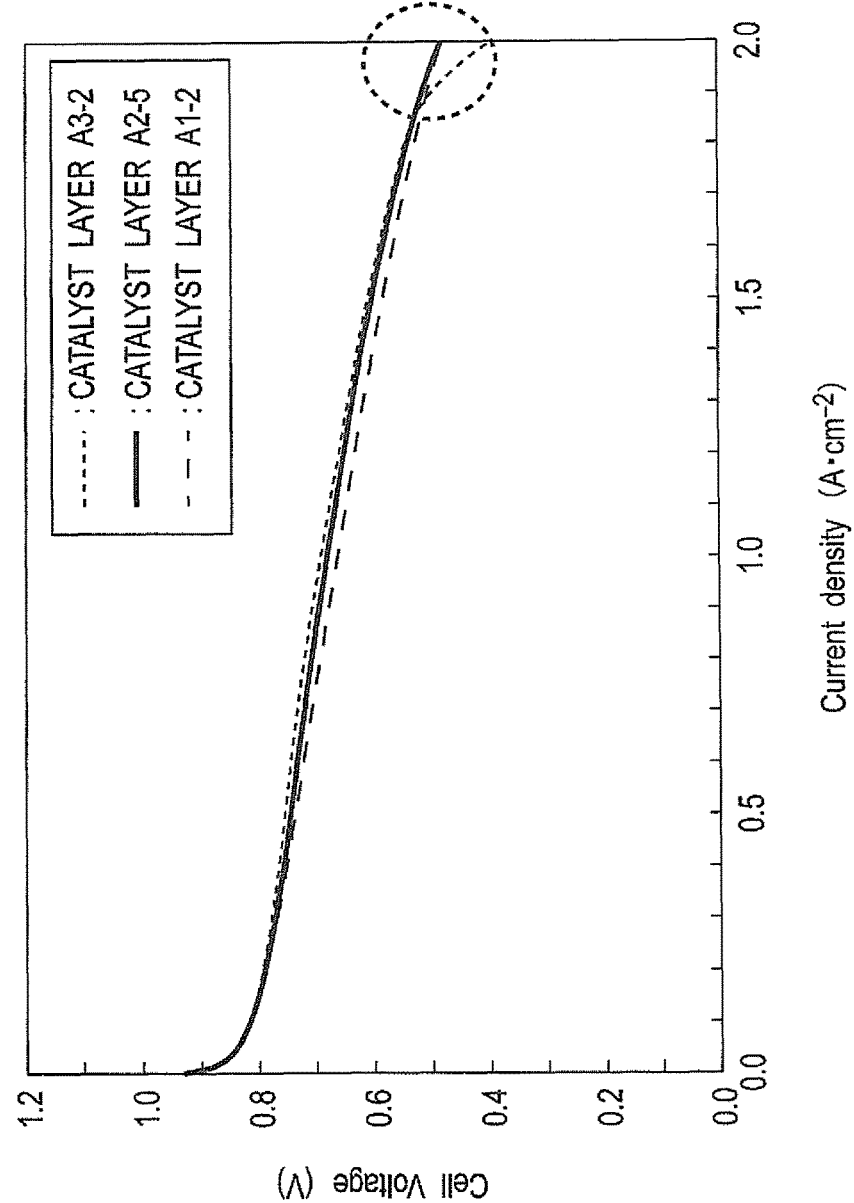
FIG. 8 is a graph showing current-voltage characteristics when an electrode catalyst layer A (A1-2, A2-5, A3-2) is used.

On the other hand, FIG. 8 is a graph showing current-voltage characteristics when the electrode catalyst layer A (A1-2, A2-5 or A3-2) is used. Meanwhile, the A1-2 has a platinum effective surface area of 104 $cm^2 \cdot cm^{-2}$ and an ionomer average thickness of 2.4 nm, and the A2-5 has a platinum effective surface area of 42 $cm^2 \cdot cm^{-2}$ and an ionomer average thickness of 3.2 nm. The A3-2 has a platinum effective surface area of 38 $cm^2 \cdot cm^{-2}$ and an ionomer average thickness of 4.6 nm. As shown in FIG. 8, when the platinum effective surface area is 104 $cm^2 \cdot cm^{-2}$, the current-voltage performances of respective catalyst layers at the maximum current become equal. In other words, there is such an advantage that, if the same current-voltage performance is to be exerted, the use amount of materials can be reduced by 20%. Meanwhile, at this time, the above-mentioned mechanism is not clear, but the current-voltage performances at the maximum current are considered to be improved to the equal level, by the cancellation of the improvement of the transportability of gas such as oxygen and the lowering of the proton transportability.

Further, in the present embodiment, for example, when a conductive support has a primary pore having a diameter of 10 nm or less, in an electrode catalyst layer, the average thickness of an ionomer is particularly preferably 2.0 nm or less. By having such a configuration that the thickness of the ionomer is reduced as described above, the increase in the transport resistance of gas such as oxygen in the primary pore can be suppressed. Therefore, even when the platinum supporting amount is furthermore reduced, both of the improvement of the transportability of gas such as oxidant gas and fuel gas and that of the proton transportability are satisfied to achieve excellent current-voltage characteristics.

Furthermore, in the electrode catalyst layer of the present embodiment, for example, when the effective surface area of platinum is 100 $cm^2 \cdot cm^{-2}$ or less, the average thickness of the ionomer is particularly preferably 1.7 nm or less. By having the configuration in which the thickness of the ionomer is reduced as described above, the increase in the transport resistance of gas such as oxygen in the primary pore can be suppressed. Therefore, even when the platinum supporting amount is reduced furthermore, it becomes possible to satisfy both of the improvement of the transportability of gas such as oxidant gas and fuel gas and that of the proton transportability to achieve excellent current-voltage characteristics.

Figure 9:
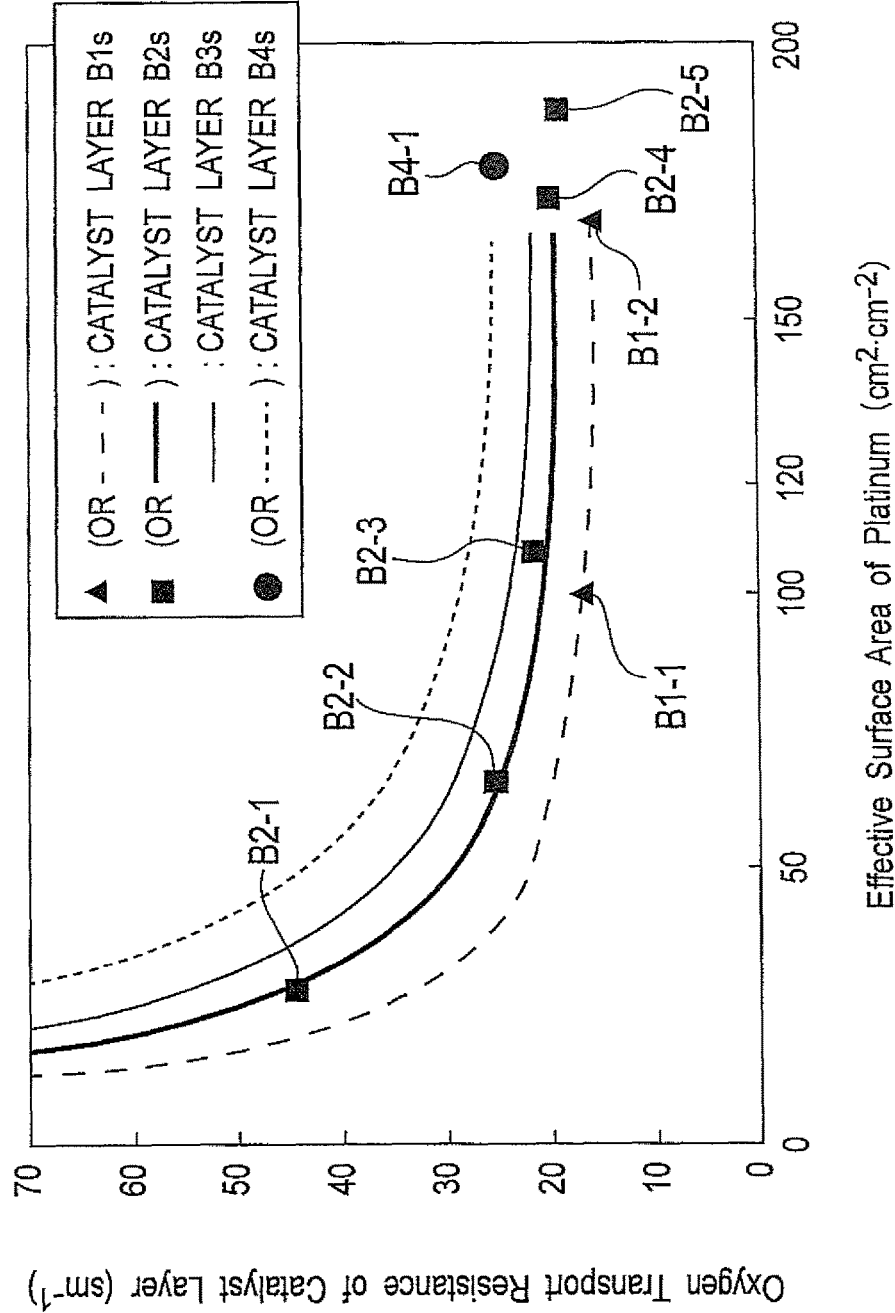
FIG. 9 is a graph showing the relationship between a platinum effective surface area and oxygen transport resistance of an electrode catalyst layer when an electrode catalyst layer B (B1s, B2s, B3s, B4s etc.) is used.

FIG. 9 is a graph showing the relationship between the platinum effective surface area and the oxygen transport resistance of the electrode catalyst layer when an electrode catalyst layer B (B1s, B2s, B3s, B4s etc.) is used. Meanwhile, the B1s has the ionomer average thickness of 1.7 nm, and the B2s has the ionomer average thickness of 2.0 nm. The B3s has the ionomer average thickness of 2.4 nm, and the B4s has the ionomer average thickness of 3.0 nm. From FIG. 9, the followings can be recognized. That is, when the platinum effective surface area is 100 $cm^2 \cdot cm^{-2}$ or less in the catalyst layer B1s having the ionomer average thickness of 1.7 nm, the oxygen transport resistance tends to increase. Further, in the case of the catalyst layer B2s having the ionomer average thickness of 2 nm, when the platinum effective surface area is 120 $cm^2 \cdot cm^{-2}$ or less, the oxygen transport resistance tends to increase in the same way. On the other hand, in the case where the platinum effective surface area is 120 $cm^2 \cdot cm^{-2}$ or less, when the ionomer average thickness is set to be 2 nm or less, both of excellent oxygen transportability and proton transportability can be satisfied to achieve good current-voltage characteristics. Further, in the case where the platinum effective surface area is 100 $cm^2 \cdot cm^{-2}$ or less, when the ionomer thickness is set to be 1.7 nm or less, both of excellent oxygen transportability and proton transportability can be satisfied to achieve good current-voltage characteristics.

Figure 10:
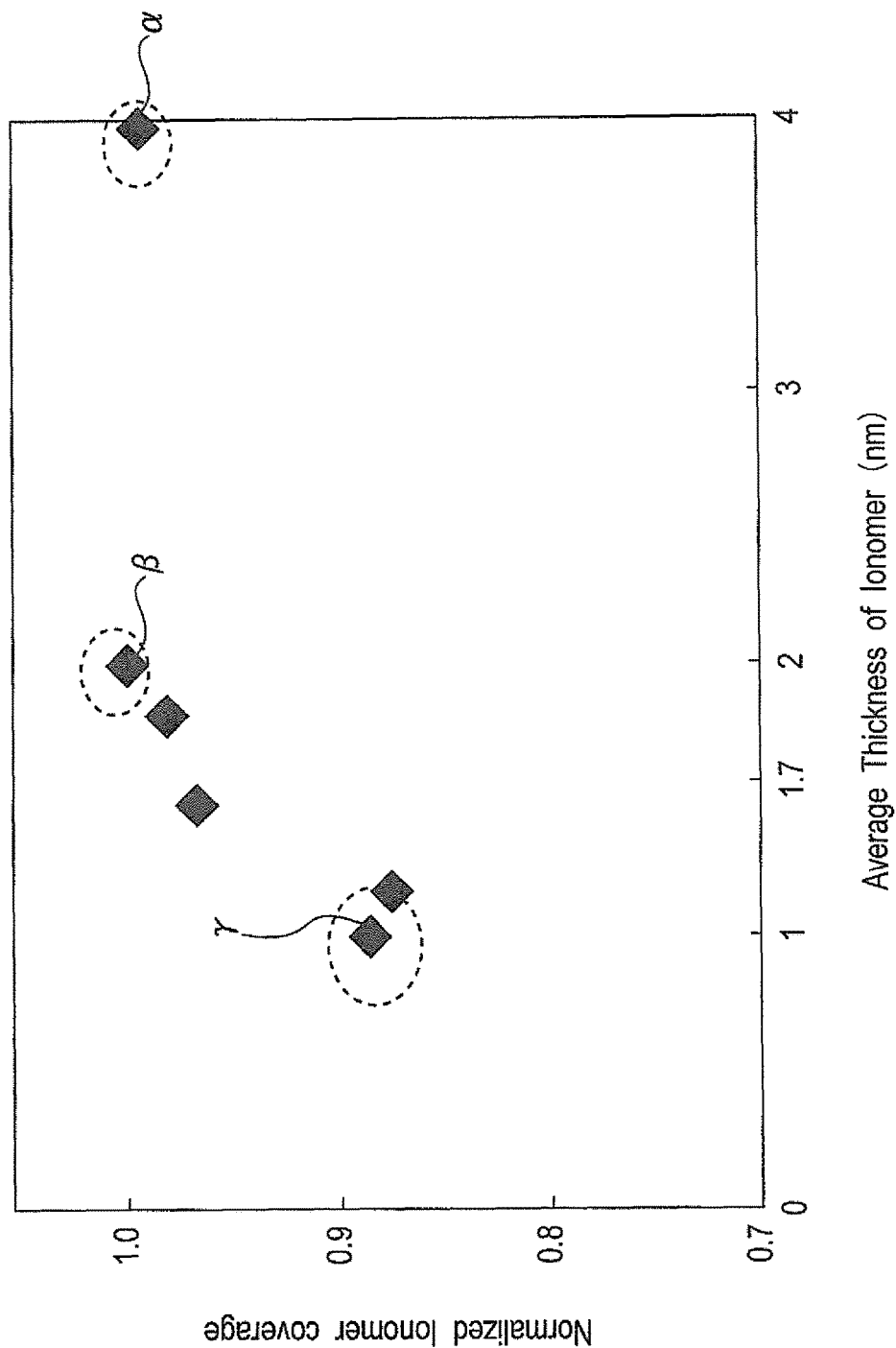
FIG. 10 is a graph showing the relationship between an ionomer average thickness and an ionomer coverage in a conductive support.

FIG. 10 is a graph showing the relationship between the ionomer average thickness and the ionomer coverage in a conductive support. Meanwhile, the coverage on the ordinate is normalized by the value of (β) having the highest value among measured values. Meanwhile, (α) corresponds to the case where the ionomer average thickness is 4.0 nm, (β) corresponds to the case where the ionomer average thickness is 2.0 nm, and (γ) corresponds to the case where the ionomer average thickness is 1.0 nm. Furthermore, FIGS. 11A-11C are drawings that explain the analytical result of a covering structure of the ionomer in FIG. 10, based on the molecular dynamics. FIGS. 11A-11C(a) are plan views, and FIGS. 11A-11C(b) are cross-sectional views. As shown in FIG. 10 and FIGS. 11A-11C, along with the decrease in the ionomer average thickness, a region in which the conductive support surface is exposed is brought about to exist. Meanwhile, a part surrounded by a dotted line in FIGS. 11A-11C shows a region in which the conductive support surface is exposed. In the consideration at this time, when such region increases, the transport resistance of gas such as oxygen is considered to be reduced remarkably, because gas tends to selectively pass easily.

Further, in the present embodiment, for example, the ratio of the surface area of a metal particle contained in the primary pore of the conductive support relative to the surface area of the metal particle supported by the conductive support is preferably 50% or more. Meanwhile, the ratio between the above-mentioned surface areas can be considered to be equal to the ratio of a metal particle existing in the primary pore of carbon, and can be calculated from FIGS. 12A-12C as shown in Table 1. That is, the ratio of a platinum particle existing inside the carbon support in Table 1 is equal to the ratio between the above-mentioned surface areas. Also, by having such configuration, when the platinum supporting amount is reduced, both of the transportability of gas such as oxidant gas and fuel gas and the proton transportability can be satisfied to achieve good current-voltage characteristics. Furthermore, by adopting such configuration, it becomes possible to reduce a contact ratio between the ionomer covering the electrode catalyst and a catalyst component including a metal particle containing platinum. Consequently, there is also such an advantage that suppression of poisoning of the catalyst component by the ionomer can be achieved.

Figure 12A:
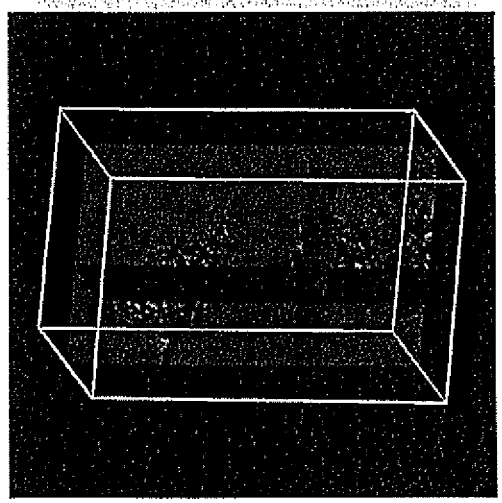
FIGS. 12A-12C are 3-direction digital slice images of an electrode catalyst C, an electrode catalyst D and an electrode catalyst E, respectively.
Figure 12B:
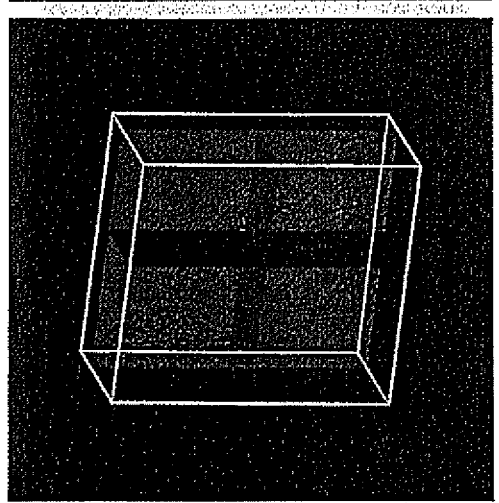
Figure 12C:
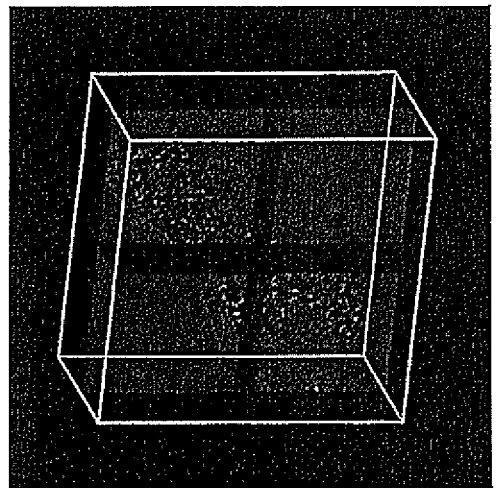

FIGS. 12A-12C show 3-direction digital slice images of electrode catalyst C, electrode catalyst D and electrode catalyst E, respectively. Meanwhile, the electrode catalyst C uses Ketjenblack as a conductive support, uses a metal particle containing platinum as a platinum metal particle, and has a form of powder. The electrode catalyst D uses Ketjenblack as a conductive support, uses a metal particle containing platinum as a platinum metal particle, and has a form of catalyst layer. The electrode catalyst E uses acetylene black as a conductive support, uses a metal particle containing platinum as a platinum metal particle, and has a form of catalyst layer. Meanwhile, in respective catalysts, the platinum metal particle was supported by the same material and the same method. As described above, it is possible to say that FIGS. 12A-12C show the carbon support and the platinum supported thereby by a slice image. In Table 1, measurement results of respective parameters in respective catalysts are shown. In Table 1, the term "AVERAGE PARTICLE DIAMETER OF PLATINUM" means the average particle diameter of platinum particles observed in FIG. 12. The term "TOTAL NUMBER OF PLATINUM PARTICLES" means the number of all platinum particles existing in FIGS. 12A-12C. The term "RATIO OF PLATINUM PARTICLES EXISTING INSIDE CARBON SUPPORT" means a value obtained by dividing the number of platinum particles inside the carbon support by the total number of platinum particles.

TABLE 1

| | CATALYST TYPE | | |
|---|---|---|---|
| | ELECTRODE CATALYST C | ELECTRODE CATALYST D | ELECTRODE CATALYST E |
| AVERAGE PARTICLE DIAMETER OF PLATINUM (nm) | 2.6 | 2.0 | 3.1 |
| TOTAL NUMBER OF PLATINUM PARTICLES (particles) | 1102 | 459 | 1193 |

TABLE 1-continued

| | CATALYST TYPE | | |
|---|---|---|---|
| | ELECTRODE CATALYST C | ELECTRODE CATALYST D | ELECTRODE CATALYST E |
| NUMBER OF PLATINUM PARTICLES INSIDE CARBON SUPPORT (particles) | 955 | 351 | 918 |
| RATIO OF PLATINUM PARTICLES EXISTING INSIDE CARBON SUPPORT | 0.87 | 0.76 | 0.77 |

Electrode catalysts C to E in Table 1 are those that are made in the same way respectively, as aforementioned, and therefore it is recognized that platinum particle diameter distribution is approximately uniform and the value of average particle diameter is approximately the same. As described above, the ratio of the surface areas is considered to be a value equal to the ratio of the number of particles. That is, it is recognized that, in the electrode catalysts C to E, the ratio of the surface area of the metal particles included in the primary pore of the conductive support relative to the surface area of platinum particles supported by the conductive support is 50% or more.

Furthermore, in the present embodiment, for example, the electrode catalyst layer preferably has a thickness of 5 μm or less. By having such configuration, the increase in proton transport resistance can be suppressed. Consequently, even when the platinum supporting amount is furthermore reduced, both of the improvement of the transportability of gas such as oxidant gas and fuel gas and that of the proton transportability can be satisfied to achieve good current-voltage characteristics.

Figure 13:
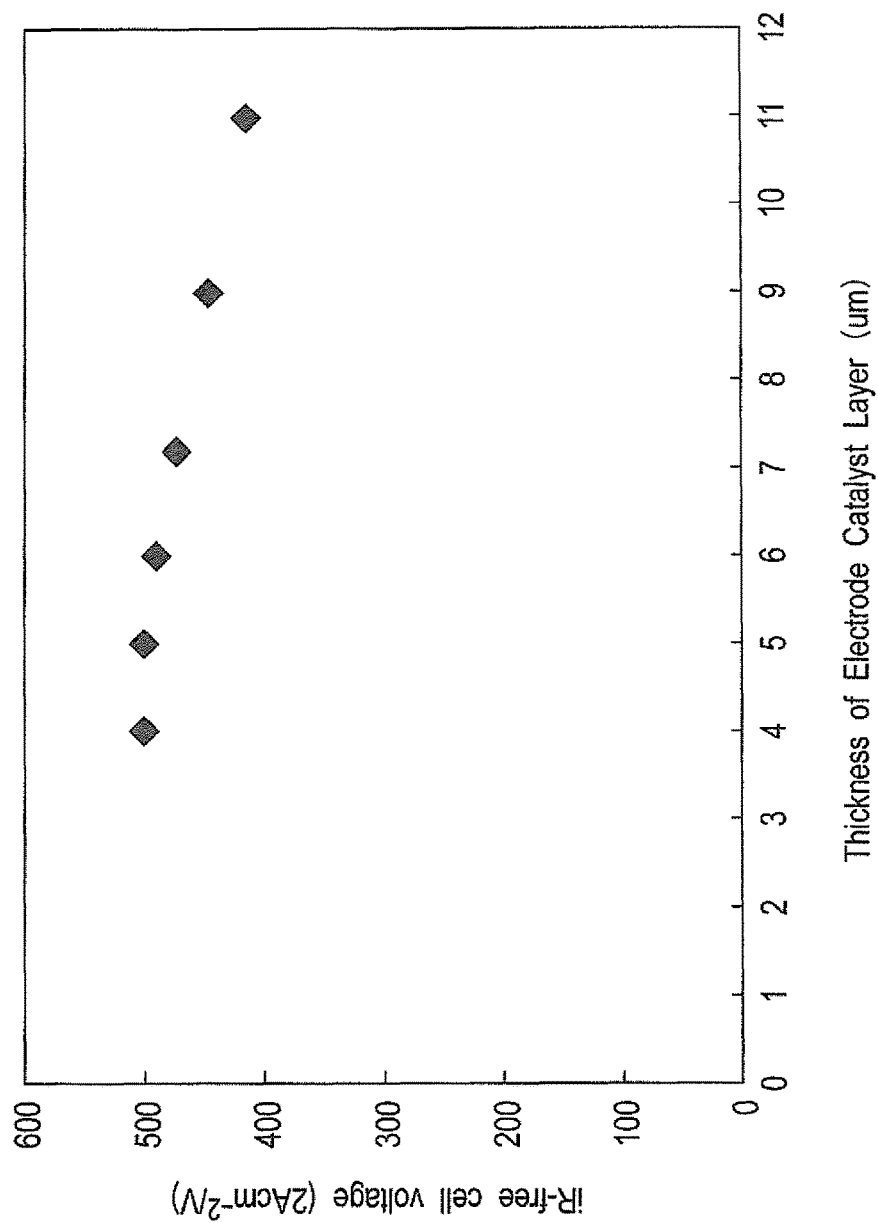
FIG. 13 is a graph showing the relationship between the thickness of an electrode catalyst layer and a cell voltage when the platinum effective surface area is set to be the same.

FIG. 13 is a graph showing the relationship between the thickness of the electrode catalyst layer and a cell voltage when the platinum effective surface area is set to be the same. From FIG. 13, it is recognized that the cell voltage lowers when the thickness of the electrode catalyst layer exceeds 5 μm. The main cause thereof is considered to be proton transport resistance inside the electrode catalyst layer, that is, IR loss.

Further, in the present embodiment, for example, in the electrode catalyst layer, the concentration of a metal particle supported in the electrode catalyst is preferably 50 mass percent or more. Also, by having such configuration, when the platinum supporting amount is reduced, both of the transportability of gas such as oxidant gas and fuel gas and the proton transportability can be satisfied simultaneously to achieve good current-voltage characteristics. Furthermore, in the case where the concentration supported is made high, as described above, even when the amount of platinum is the same, the thickness of the electrode catalyst layer can be reduced, and the reduction of transport resistance of gas (such as oxygen) in the secondary pore in the electrode catalyst layer becomes possible, and, therefore, better current-voltage characteristics can be achieved.

Figure 14:
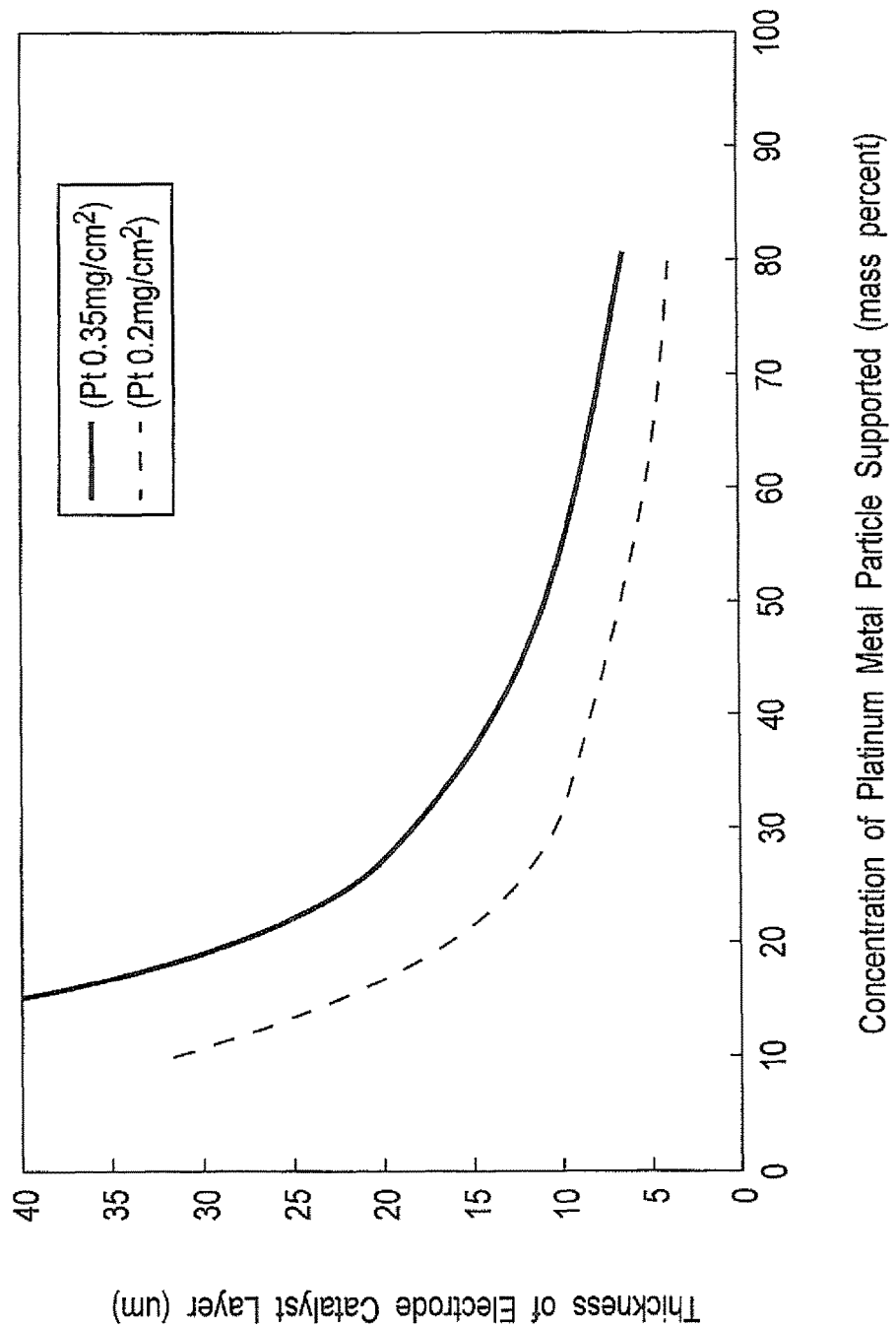
FIG. 14 is a graph showing the relationship between the concentration of a platinum metal particle supported and the thickness of an electrode catalyst layer in an electrode catalyst.

FIG. 14 is a graph showing the relationship between the concentration of a platinum metal particle supported and the thickness of the electrode catalyst layer in an electrode catalyst. From FIG. 14, it is recognized that, when the concentration of a platinum metal particle supported is increased, in the case where the use amount (mg/cm$^2$) of platinum is set to be the same, the thickness of the electrode catalyst layer can be made thinner.

Furthermore, in the present embodiment, for example, the ion exchange equivalent (EW) of the ionomer in the electrode catalyst layer is preferably 800 or less. By adopting such configuration, more reduction of proton transport resistance in the electrode catalyst layer becomes possible. Accordingly, better current-voltage characteristics can be achieved.

Figure 15:
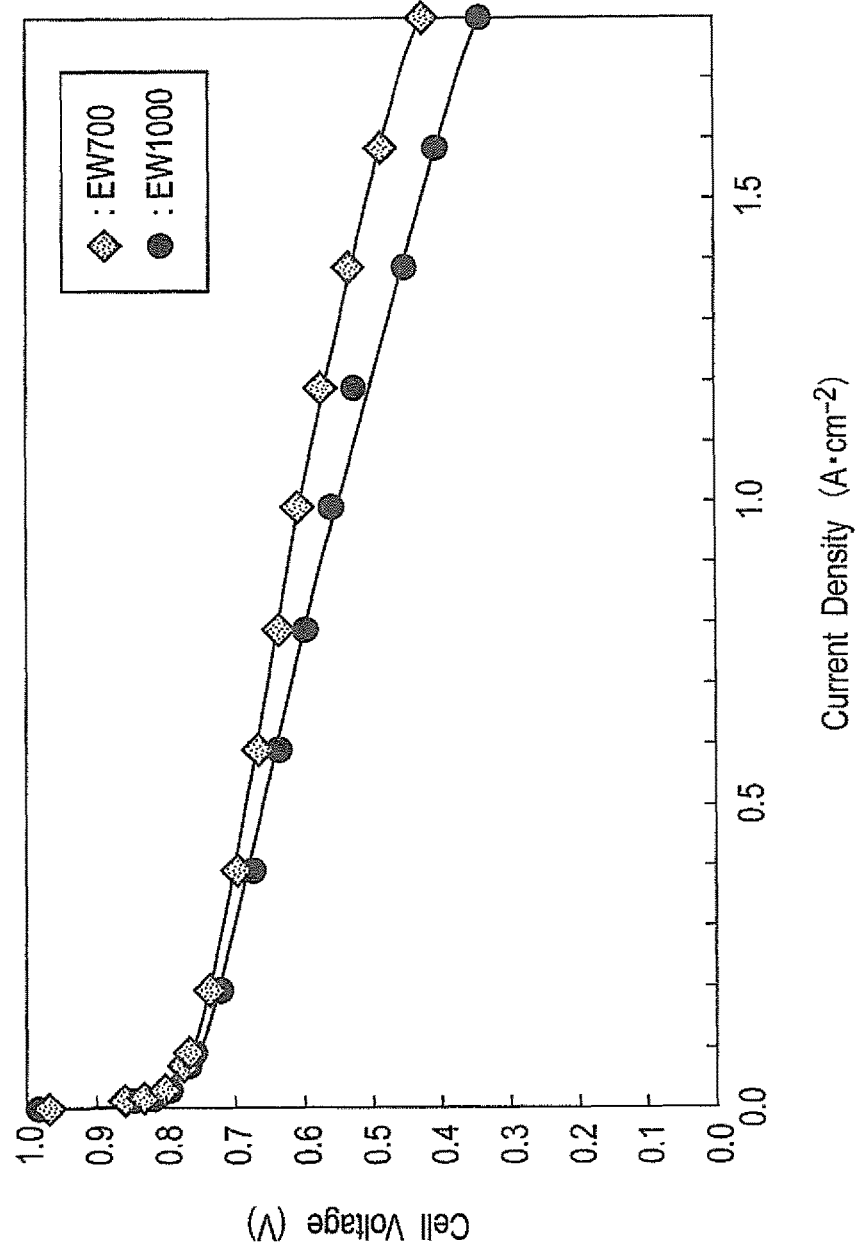
FIG. 15 is a graph showing current-voltage characteristics when an ionomer of each ion exchange equivalent is applied.

FIG. 15 is a graph showing current-voltage characteristics when an ionomer of each ion exchange equivalent is applied. Meanwhile, the ion exchange equivalent means a gram number of an electrolyte per 1 mole of an acidic functional group. The mole number of the acidic functional group can be calculated based on the result of an acid-base titration, and the ion exchange equivalent is obtained by dividing the mass of the electrolyte by the mole number thereof. From FIG. 15, it is recognized that, when an ionomer having an ion exchange equivalent of 700 lower than an ion exchange equivalent of 800 is used, better current-voltage characteristics can be achieved as compared with the case where an ionomer having an ion exchange equivalent of 1000 is used. This is thought to be resulted from the improvement of the proton transportability.

Furthermore, in the present embodiment, for example, the conductive support in the electrode catalyst layer preferably has 0.34 mmol or more of acidic functional groups per 1 g of the conductive support. The amount of the acidic functional group can be obtained from the acidity measured by acid-base titration. By adopting such configuration, water can be held in the electrode catalyst layer, and more reduction of proton transport resistance becomes possible. Accordingly, better current-voltage characteristics can be achieved.

Figure 16:
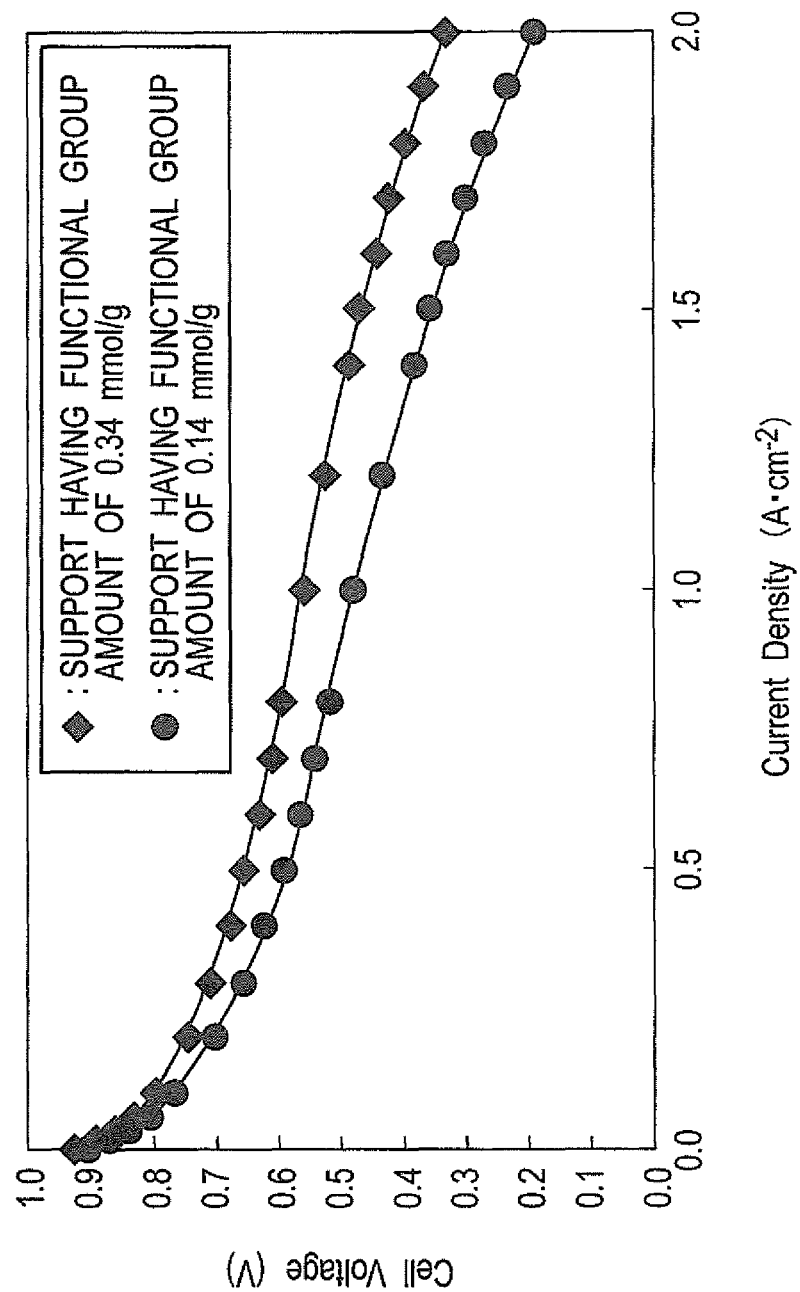
FIG. 16 is a graph showing current-voltage characteristics when a conductive support of each acidic functional group amount is applied.

FIG. 16 is a graph showing current-voltage characteristics when a conductive support of each acidic functional group amount is applied. From FIG. 16, it is recognized that, when a conductive support having 0.34 mmol of acidic functional groups per 1 g of the conductive support is used, better current-voltage characteristics can be achieved as compared with the case where a conductive support having 0.14 mmol of acidic functional groups per 1 g of the conductive support is used. This is thought to be resulted from the increase in water content in the electrode catalyst layer when exposed to the same relative humidity by having the acidic functional group to improve the proton transportability.

Hereinafter, the above-mentioned respective constituent materials in the above-mentioned respective embodiments will be explained in more detail.

[Polymer Electrolyte Membrane]

The polymer electrolyte membrane 11 has such a function as allowing a proton generated in the anode electrode catalyst layer 13a in the operation of the fuel cell (stack) 1 to pass through selectively to the cathode electrode catalyst layer 13c along the membrane thickness direction. Further, the solid polymer electrolyte membrane 11 also has such a function as a partition wall for preventing fuel gas supplied to the anode side and oxidant gas supplied to the cathode side from being mixed.

The solid polymer electrolyte membrane 11 is classified roughly into a fluorine-based polymer electrolyte membrane and a hydrocarbon-based polymer electrolyte membrane, depending on the type of ion-exchange resin that is a constituent material. Examples of the ion-exchange resins constituting the fluorine-containing polymer electrolyte membrane include perfluorocarbon sulfonic acid-based polymers such as Nafion, Aciplex (registered trade mark, manufactured by Asahi Kasei Chemicals Corporation), FLEMION (registered trade mark, manufactured by Asahi Glass Co., Ltd.) etc. In addition, perfluorocarbon phosphonic acid-based polymer, trifluorostyrene sulfonic acid-based polymer, ethylenetetrafluoroethylene-g-styrene sulfonic acid-based polymer, ethylene-tetrafluoroethylene copolymer, polyvinylidenefluoride-perfluorocarbon sulfonic acid-based polymer etc. are mentioned. From the viewpoint of improving power generation performance such as heat resistance and chemical stability, these fluorine-containing polymer electrolyte membranes are used preferably, and, particularly preferably, a fluorine-containing polymer electrolyte membrane including perfluorocarbon sulfonic acid-based polymer is used.

Examples of the ion-exchange resin constituting a hydrocarbon-based electrolyte membrane include sulfonated polyether sulfone (S-PES), sulfonated polyarylether ketone, sulfonated polybenzimidazole, phosphonated polybenzimidazole, sulfonated polystyrene, sulfonated polyetherether ketone (S-PEEK), sulfonated polyphenylene (S-PPP) etc. From the viewpoint of manufacturing such as inexpensive raw materials, simple and easy manufacturing processes and high selectivity of materials, these hydrocarbon-based polymer electrolyte membranes are used preferably. Meanwhile, as to the above-mentioned ion-exchange resins, one type may be used alone, or two or more types may be used in combination. Further, they are not limited to the above-mentioned materials, but other materials may be used.

The thickness of the polymer electrolyte membrane may be determined while taking characteristics of a fuel cell to be obtained into consideration, and is not particularly limited. The thickness of a polymer electrolyte membrane is, usually, from 5 to 300 μm. When the thickness of a polymer electrolyte membrane is in the numerical range, strength in membrane formation, and balance between durability in use and output characteristics in use can be controlled appropriately.

[Electrode Catalyst Layer]

The anode electrode catalyst layer 13a and the cathode electrode catalyst layer 13c in the present embodiment are layers in which a cell reaction progresses actually. Specifically, in the anode electrode catalyst layer 13a, an oxidation reaction of hydrogen progresses, and, in the cathode electrode catalyst layer 13c, a reduction reaction of oxygen progresses.

(Metal Particle)

The metal particle 131b, which is used for the anode electrode catalyst layer and contains platinum, is not particularly limited as long as it has a catalyst action on the oxidation reaction of hydrogen, and a conventionally known catalyst can be applied thereto. The metal particle used for the cathode electrode catalyst layer is also not particularly limited, as long as it contains platinum and has a catalyst action on the reduction reaction of oxygen, and a conventionally known catalyst can be used in the same way. Specific examples of the metal particles include a single particle of platinum (Pt), a mixture of a platinum particle with another metal particle of at least one metal selected from the group consisting of ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mn), vanadium(V), molybdenum (Mo), gallium (Ga) and aluminum (Al), and an alloy of platinum with another metal, etc.

A metal particle containing at least platinum is used, for improving a catalyst activity, poisoning resistance against carbon monoxide etc., heat resistance, etc. The composition of the above-mentioned alloys is, although it depends on kinds of metals to be alloyed, preferably set so that the content of platinum is from 30 to 90 atom percent and the content of a metal to be alloyed with the platinum is from 10 to 70 atom percent. Meanwhile, an alloy is a generic name of a material that is a metal element to which, generally, one or more kinds of metal elements or nonmetal elements are added, and that has a metallic quality. As to the structure of alloys, there are an eutectic alloy, so to speak a mixture, in which constituent elements form discrete crystals, an alloy in which constituent elements are completely dissolved each other to form a solid solution, an alloy in which constituent elements form an intermetallic compound or a compound of a metal and a nonmetal, etc., and, in the present invention, any of these is usable. On this occasion, a metal particle for use in the anode electrode catalyst layer and a metal particle for use in the cathode electrode catalyst layer can be selected suitably from the above. In the present invention, unless otherwise specified, as to metal particles for use in the anode electrode catalyst layer or in the cathode electrode catalyst layer, both can be defined in the same way. Accordingly, they are collectively called "a metal particle." However, metal particles in the anode electrode catalyst layer and in the cathode electrode catalyst layer are not necessarily the same each other, and can be selected suitably so as to exert an intended action as described above.

The size of the metal particle is not particularly limited, and a size same as that of conventionally known catalysts can be adopted. On this occasion, the average particle diameter of the metal particle is preferably from 1 to 30 nm, more preferably from 1 to 2.3 nm. When the average particle diameter of the metal particle is of a value in the range, the balance between a catalyst utilization ratio relating to an effective electrode area in which an electrochemical reaction progresses, and simplicity of support can be controlled appropriately. Meanwhile, the "average particle diameter of the metal particle" can be measured as the average value of crystallite diameters obtained from the half-value width of a diffraction peak of the metal particle in X-ray diffraction, or of particle diameters of metal particles examined from an image by a transmission electron microscope.

(Conductive Support)

The conductive support is not particularly limited, as long as it functions as a support for supporting the above-mentioned metal particle and as an electron conduction path material that participates in giving and receiving of electrons between the metal particle and another member, and conventionally known conductive supports can be used in the same way. As the conductive support, a material that has a specific surface area for supporting the metal particle in an intended dispersion state and has a sufficient electroconductivity is satisfactory, and preferably the main component is carbon.

Specific examples of the carbon include carbon black such as acetylene black, channel black, oil (gas) furnace black, lamp black, thermal black and Ketjenblack, black pearl, graphitized acetylene black, graphitized channel black, graphitized oil (gas) furnace black, graphitized lamp black, graphitized thermal black, graphitized Ketjenblack, graphitized black pearl, carbon nanotube, carbon nanofiber, carbon nanohorn, carbon fibril, activated carbon, coke, natural graphite, artificial graphite, etc. Examples of the oil (gas) furnace black include VULCAN etc., and examples of the graphitized oil (gas) furnace black include VULCAN etc.

Meanwhile, the phrase "main component is carbon" means that a carbon atom is contained as the main component. That is, it is used as a concept that includes both "consisting of carbon atoms" and "consisting essentially of carbon atoms." Accordingly, depending on conditions, in order to improve characteristics of a fuel cell, an element other than a carbon atom may be contained. The phrase "consisting essentially of carbon atoms" means that a mixture of an impurity of from 2 to 3 mass percent or less may be allowed.

The BET specific surface area of the conductive support is preferably a specific surface area that is sufficient for supporting metal particles in a highly dispersed manner. Specifically, it is preferably from 20 to 1600 m$^2$/g, more preferably from 80 to 1200 m$^2$/g. When the specific surface area of the conductive support is in the range of such numerical values, the balance between the dispersibility of metal particles in the conductive support and the effective utilization ratio of the metal particle as a catalyst component can be controlled appropriately.

The size of the conductive support is also not particularly limited, but, from the viewpoint of simplicity of supporting, utilization ratio of the metal particle as a catalyst, control of the thickness of the electrode catalyst layer in an appropriate range, etc., the average particle diameter is preferably around from 5 to 200 nm. More preferably, the average particle diameter is set to be from 10 to 100 nm.

The concentration of the metal particle supported by the conductive support is, relative to the total amount of the electrode catalyst, preferably from 50 to 80 mass percent, more preferably from 50 to 70 mass percent. When the amount of the metal particle supported is in the range of such numerical values, the balance between the degree of dispersion of metal particles on the conductive support and the catalyst performance can be controlled appropriately. Meanwhile, the concentration of the metal particle supported by the conductive support can be measured by inductively coupled plasma emission spectroscopy (ICP).

(Ionomer)

Examples of the ionomer include a fluorine-based polymer electrolyte material and a hydrocarbon-based polymer electrolyte material. According to the type of an ion-exchange resin that is a constituent material, it is classified roughly into the fluorine-based polymer electrolyte material and the hydrocarbon-based polymer electrolyte material.

Examples of the ion-exchange resins constituting the fluorine-based polymer electrolyte material include perfluorocarbonsulfonic acid-based polymer such as Nafion, Aciplex and Flemion, perfluorocarbonphosphonic acid-based polymer, trifluorostyrenesulfonic acid-based polymer, ethylenetetrafluoroethylene-g-styrenesulfonic acid-based polymer, ethylene-tetrafluoroethylene copolymer, polyvinylidene fluoride-perfluorocarbonsulfonic acid-based polymer, etc. From the viewpoint of improving the power generation performance such as heat resistance and chemical stability, these fluorine-based polymer electrolyte materials are preferably used, and, particularly preferably, perfluorocarbonsulfonic acid-based polymer is used.

Examples of the ion-exchange resins constituting the hydrocarbon-based electrolyte material include sulfonated polyether sulfone (S-PES), sulfonated polyarylether ketone, sulfonated polybenzimidazole, phosphonated polybenzimidazole, sulfonated polystyrene, sulfonated polyetherether ketone (S-PEEK), sulfonated polyphenylene (S-PPP), etc. From the viewpoint of manufacturing such as inexpensive raw materials, simple manufacturing processes and high selectivity of materials, these hydrocarbon-based polymer electrolyte materials are used preferably. Meanwhile, the above-mentioned ion-exchange resins may be used in one kind alone, or in two or more kinds in combination. Further, they are not limited to the above-mentioned materials, and other materials may also be used.

As described above, the ion exchange equivalent (EW) of the ionomer in the electrode catalyst layer is preferably 800 or less. By adopting such constitution, in the electrode catalyst layer, further reduction of the proton transport resistance becomes possible. Consequently, better current-voltage characteristics can be achieved. However, the present invention is not limited to be in the range of the suitable numerical values.

[Gas Diffusion Layer]

The anode gas diffusion layer 20a and the cathode gas diffusion layer 20c in the present embodiment have such a function as accelerating diffusion of fuel gas or oxidant gas supplied via the gas flow path (GPa or GPc) of the separator into the electrode catalyst layer (13a or 13c), and a function as an electron conduction path.

The material constituting a base material of the gas diffusion layer is not particularly limited, and conventionally known information may be referred to appropriately. Examples of the materials include sheet-shaped materials having electroconductivity and porous property such as woven or nonwoven cloth made of carbon, a paper-shaped paper-made body, a wire net and metallic mesh, punching metal and expanded metal. The thickness of the base material may be determined suitably while taking characteristics of the gas diffusion layer to be obtained into consideration, and around from 30 to 500 μm is satisfactory. When the thickness of the base material is of a value in such range, the balance between mechanical strength and diffusibility of gas and water can be controlled appropriately.

The gas diffusion layer preferably contains a water repellent agent for enhancing furthermore a water repellent property for the purpose of preventing a flooding phenomenon etc. As the water repellent agent, although not particularly limited, fluorine-based polymer materials and olefin-based polymer materials are mentioned. Examples of the fluorine-based polymer materials include polytetrafluoroethylene (PTFE), polyvinylidene fluoride (PVdF), polyhexafluoropropylene (PHFP) and tetrafluoroethylene-hexafluoropropylene copolymer (TFE-HFP), etc. Examples of the olefin-based polymer materials include polypropylene (PP), polyethylene (PE), etc.

Further, in order to improve the water repellent property, the gas diffusion layer may have a carbon particle layer (microporous layer: MPL) including an aggregate of carbon particles containing a water repellent agent, which is not illustrated, on the electrode catalyst layer side of the base material.

The carbon particle contained in the carbon particle layer is not particularly limited, and a conventionally known material such as carbon black, graphite or exfoliated graphite can be adopted thereto suitably. Among these, from excellent electroconductivity and a large specific surface area, carbon black such as oil furnace black, channel black, lamp black, thermal black or acetylene black is used preferably. The average particle diameter of the carbon particle may be set to be around from 10 to 100 nm. Consequently, a high drainage property caused by capillary force is obtained, and the improvement of a contacting property with the catalyst layer becomes possible.

As the water repellent agent for use in the carbon particle layer, those same as the above-described water repellent agents are mentioned. Among these, the use of a fluorine-based polymer material is preferable, because of excellent water repellent property, corrosion resistance in an electrode reaction, etc.

The mixing ratio of the carbon particle and the water repellent agent in the carbon particle layer is, while taking the balance between a water repellent property and electroconductivity into consideration, in mass ratio, carbon particle: water repellent agent is preferably around from 90:10 to 40:60. Meanwhile, the thickness of the carbon particle layer is also not particularly limited, and may be determined suitably while taking the water repellent property of a gas diffusion layer to be obtained into consideration.

[Separator]

The separator 30 can be obtained, for example, by applying a press treatment to a thin plate having a thickness of 0.5 mm or less to mold it into a concave-convex shape as shown in FIG. 1, but the separator is not limited only to such form. For example, by applying a cutting treatment to a metal plate in a flat plate shape as a metal base material, a concave-convex shape configuring a gas flow path and a coolant flow path may be formed.

Materials that constitute the separator are not particularly limited, and conventionally known materials can be applied thereto. A material through which gas to be supplied passes hardly is preferable, and a material through which electric current taken out by a cell reaction flows easily is preferable. Specific examples thereof include metal materials such as iron, titanium, aluminum and alloys thereof, metal materials in which corrosion resistance is improved by forming a film of a carbon material etc., polymer materials to which electroconductivity is given with a metal material or a carbon material, etc. Meanwhile, the iron alloy includes stainless steel, and the polymer material includes electroconductive plastic. These may have one layer, or have a stacked structure of two or more layers.

The manufacturing method of the fuel cell is not particularly limited, and knowledge conventionally known in the field of fuel cells can be referred to suitably. Above-mentioned electrode catalyst layer, electrode, membrane electrode assembly and fuel cell can be fabricated, for example, by a following method.

First, metal catalyst particles are dispersed and supported by a conductive support to fabricate an electrode catalyst. At this time, a conventionally known method such as a precipitation method, a gelation method, an impregnation method and an ion-exchange method can be applied. Meanwhile, by performing a few pre-examinations, whether or not an intended structure has been formed by the fabrication process of the electrode catalyst is checked. The pre-examination is performed by observation with a scanning or transmission electron microscope after preparation and drying. Subsequently, the conductive support supporting a metal catalyst particle, the ionomer and a solvent for the ionomer are mixed. After that, by disposing the obtained mixture on a polymer electrolyte membrane by spray coating or printing, an electrode catalyst layer is formed directly. Consequently, the electrode catalyst layer, electrode and membrane electrode assembly can be obtained, and, furthermore, by sandwiching the same with a gas diffusion layer, separator etc., a fuel cell can be obtained. Further, as to another formation method of the electrode catalyst layer etc., by disposing the obtained mixture on a gas diffusion layer by spray coating or printing, an electrode catalyst layer is formed directly. Consequently, the electrode catalyst layer and electrode can be obtained. Further, by sandwiching the polymer electrolyte membrane with the gas diffusion layer for which the electrode catalyst layer is formed, the membrane electrode assembly and fuel cell can be obtained. Furthermore, as to another formation method of the electrode catalyst layer etc., the electrode catalyst layer is formed by disposing the obtained mixture on a transfer material such as a film by spray coating, printing etc. By transferring the same onto the polymer electrolyte membrane, the membrane electrode assembly can be obtained. Also, in the formation process of the electrode catalyst layer etc., by performing a few pre-examinations in the same manner as above, whether or not an intended structure has been formed is checked.

Fuel used when operating a fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, diethylene glycol etc. can be used. Among these, in that increase of output is possible, hydrogen and methanol are used preferably.

EXAMPLES

Hereinafter, the present invention will be explained specifically based on Examples, but the present invention is not limited only to these Examples.

Test Example of A1-1

Fabrication of Membrane Electrode Assembly Having Electrode Catalyst Layer A1-1

First, Ketjenblack having a nitrogen BET specific surface area of 718 $m^2/g$ was calcined in an electric furnace at 2000° C. for 1 hour under a nitrogen atmosphere to generate graphitized Ketjenblack. Meanwhile, in the graphitized Ketjenblack obtained here, no primary fine pore having a diameter of 10 nm or less was observed. Meanwhile, the ratio of volume of fine pores having a fine pore diameter in a specific range in a catalyst layer can be examined by measuring fine pore distribution in the catalyst layer using a nitrogen adsorption method. Next, so that the concentration of a platinum particle supported in an electrode catalyst became 50 mass percent, 5 mass parts of the graphitized Ketjenblack as a conductive support was dispersed sufficiently in 2500 mass parts of an acidic aqueous solution of platinum chloride containing 0.2 mass percent of platinum using a homogenizer. As the graphitized Ketjenblack, one having a nitrogen BET specific surface area of 151 $m^2/g$ was used. Next, 50 mass parts of sodium citrate was added and mixed sufficiently to prepare a reaction liquid. Furthermore, using a reflux reaction apparatus, the reaction liquid was refluxed with stirring at 85° C. for 4 hours to make platinum be reduced and supported on the surface of the graphitized Ketjenblack. After the end of the reaction, the sample solution was cooled, left at room temperature, the graphitized Ketjenblack powder supporting platinum was filtrated with a suction filtration apparatus and washed sufficiently with water. After that, the powder washed with water was dried under reduced pressure at 80° C. for 6 hours to obtain an electrode catalyst including the graphitized Ketjenblack supporting platinum.

Next, 10 mass parts of the electrode catalyst including the graphitized Ketjenblack supporting platinum, 50 mass parts of ion-exchanged water, 5 mass parts of isopropyl alcohol, and 7 mass of Nafion, which is the ionomer, were mixed. Furthermore, by dispersing sufficiently these with an ultrasonic homogenizer and, in addition, adding a defoaming operation under reduced pressure, an electrode catalyst slurry was obtained. Meanwhile, here, a Nafion solution (manufactured by Aldrich) containing 5 mass percent of Nafion was used, the Nafion having an ion exchange equivalent of 1000. The ratio of the ionomer relative to the conductive support was 0.7 in mass ratio. Meanwhile, it was checked by acid-base titration that 1 g of the conductive support had 0.07 mmol of acidic functional groups.

Next, by a screen printing method, on a transfer base material including polytetrafluoroethylene (PTFE), the electrode catalyst slurry was applied so as to give a size of 5 cm×5 cm. After that, a heat treatment was performed at 130° C. for 30 minutes to obtain the electrode catalyst layer. The platinum supporting amount at the time was 0.12 mg/cm$^2$.

As a polymer electrolyte membrane, Nafion NR211 having a thickness of 25 μm (manufactured by DuPont) was used. Around the both sides of the polymer electrolyte membrane, a gasket having a thickness of 25 μm (Teonex, manufactured by Teijin DuPont) was arranged, and, on an exposed part of the both sides of the polymer electrolyte membrane, polytetrafluoroethylene on which the electrode catalyst layer was formed was furthermore arranged. Meanwhile, a thickness of an adhesion layer in the above-mentioned gasket was 10 μm. An active area of the exposed part was set to be 5.0 cm×5.0 cm, that is, 25 cm$^2$. Then, pressure of 0.8 MPa was applied to make the polymer electrolyte membrane and respective electrode catalyst layers be adhered closely. Next, the same was heated at 150° C. for 10 minutes, and each of electrode catalyst layers was assembled with the polymer electrolyte membrane by transfer to obtain the membrane electrode assembly. A platinum effective surface area in the electrode catalyst layer of the membrane electrode assembly was 43 cm$^2$·cm$^{-2}$. The average thickness of the ionomer in the electrode catalyst layer of the membrane electrode assembly was 2.4 nm. Further, a thickness of the electrode catalyst layer of the membrane electrode assembly was 3.9 μm.

Test Example A1-2

Fabrication of Membrane Electrode Assembly Having Electrode Catalyst Layer A1-2

In order to set the platinum effective surface area to be 104 cm$^2$·cm$^{-2}$, the platinum supporting amount was changed to 0.29 mg/cm$^2$. Except for the above, the same operation as that in the test example A1-1 was repeated to obtain the membrane electrode assembly of this example.

Test Example A1-3

Fabrication of Membrane Electrode Assembly Having Electrode Catalyst Layer A1-3

In order to set the platinum effective surface area to be 123 cm$^2$·cm$^{-2}$, the platinum supporting amount was changed to 0.35 mg/cm$^2$. Except for the above, the same operation as that in the test example A1-2 was repeated to obtain the membrane electrode assembly of this example.

Test Example A1s

Fabrication of Membrane Electrode Assembly Having Electrode Catalyst Layer A1s

In order to set the platinum effective surface area to be from 10 to 170 cm$^2$·cm$^{-2}$, the platinum supporting amount was changed to from 0.03 to 0.48 mg/cm$^2$. Except for the above, the same operation as that in the test example A1-1 was repeated to obtain the membrane electrode assemblies of respective examples. That is, test examples A1-1, A1-2 and A1-3 are those that are included in the test example A1s.

Test Example A2-1

Fabrication of Membrane Electrode Assembly Having Electrode Catalyst Layer A2-1

In order to set the average thickness of the ionomer to be 3.2 nm, the ratio (mass ratio) of the ionomer relative to the conductive support was changed to 0.9. Furthermore, in order to set the platinum effective surface area to be 18 cm$^2$·cm$^{-2}$, the platinum supporting amount was changed to 0.05 mg/cm$^2$. Except for the above, the same operation as that in the test example A1-1 was repeated to obtain the membrane electrode assembly of the example.

Test Example A2-2

Fabrication of Membrane Electrode Assembly Having Electrode Catalyst Layer A2-2

In order to set the average thickness of the ionomer to be 3.2 nm, the ratio (mass ratio) of the ionomer relative to the conductive support was changed to 0.9. Furthermore, in order to set the platinum effective surface area to be 39 cm$^2$·cm$^{-2}$, the platinum supporting amount was changed to 0.12 mg/cm$^2$. Except for the above, the same operation as that in the test example A1-1 was repeated to obtain the membrane electrode assembly of the example.

Test Example A2-3

Fabrication of Membrane Electrode Assembly Having Electrode Catalyst Layer A2-3

In order to set the average thickness of the ionomer to be 3.2 nm, the ratio (mass ratio) of the ionomer relative to the conductive support was changed to 0.9. Furthermore, in order to set the platinum effective surface area to be 42 cm$^2$·cm$^{-2}$, the platinum supporting amount was changed to 0.12 mg/cm$^2$. Except for the above, the same operation as that in the test example A1-1 was repeated to obtain the membrane electrode assembly of the example.

Test Example A2-4

Fabrication of Membrane Electrode Assembly Having Electrode Catalyst Layer A2-4

In order to set the average thickness of the ionomer to be 3.2 nm, the ratio (mass ratio) of the ionomer relative to the conductive support was changed to 0.9. Furthermore, in order to set the platinum effective surface area to be 70 cm$^2$·cm$^{-2}$, the platinum supporting amount was changed to 0.21 mg/cm$^2$. Except for the above, the same operation as that in the test example A1-1 was repeated to obtain the membrane electrode assembly of the example.

Test Example A2-5, Fabrication of Membrane Electrode Assembly Having Electrode Catalyst Layer A2-5

In order to set the average thickness of the ionomer to be 3.2 nm, the ratio (mass ratio) of the ionomer relative to the conductive support was changed to 0.9. Furthermore, in order to set the platinum effective surface area to be 104 cm²·cm⁻², the platinum supporting amount was changed to 0.31 mg/cm². Except for the above, the same operation as that in the test example A1-1 was repeated to obtain the membrane electrode assembly of the example.

Test Example A2-6

Fabrication of Membrane Electrode Assembly Having Electrode Catalyst Layer A2-6

In order to set the average thickness of the ionomer to be 3.2 nm, the ratio (mass ratio) of the ionomer relative to the conductive support was changed to 0.9. Furthermore, in order to set the platinum effective surface area to be 123 cm²·cm⁻², the platinum supporting amount was changed to 0.37 mg/cm². Except for the above, the same operation as that in the test example A1-1 was repeated to obtain the membrane electrode assembly of the example.

Test Example A2s

Fabrication of Membrane Electrode Assembly Having Electrode Catalyst Layer A2s

In order to set the average thickness of the ionomer to be 3.2 nm, the ratio (mass ratio) of the ionomer relative to the conductive support was changed to 0.9. Furthermore, in order to set the platinum effective surface area to be from 10 to 170 cm²·cm⁻², the platinum supporting amount was changed to from 0.03 to 0.48 mg/cm². Except for the above, the same operation as that in the test example A1-1 was repeated to obtain the membrane electrode assemblies of respective examples. That is, test examples A2-1, A2-2, A2-3, A2-4, A2-5 and A2-6 are those that are included in the test example A2s.

Test Example A3-1

Fabrication of Membrane Electrode Assembly Having Electrode Catalyst Layer A3-1

In order to set the average thickness of the ionomer to be 4.6 nm, the ratio (mass ratio) of the ionomer relative to the conductive support was changed to 1.3. Furthermore, in order to set the platinum effective surface area to be 38 cm²·cm⁻², the platinum supporting amount was changed to 0.11 mg/cm². Except for the above, the same operation as that in the test example A1-1 was repeated to obtain the membrane electrode assembly of the example.

Test Example A3-2

Fabrication of Membrane Electrode Assembly Having Electrode Catalyst Layer A3-2

In order to set the average thickness of the ionomer to be 4.6 nm, the ratio (mass ratio) of the ionomer relative to the conductive support was changed to 1.3. Furthermore, in order to set the platinum effective surface area to be 104 cm²·cm⁻², the platinum supporting amount was changed to 0.31 mg/cm². Except for the above, the same operation as that in the test example A1-1 was repeated to obtain the membrane electrode assembly of the example.

Test Example A3-3

Fabrication of Membrane Electrode Assembly Having Electrode Catalyst Layer A3-3

In order to set the average thickness of the ionomer to be 4.6 nm, the ratio (mass ratio) of the ionomer relative to the conductive support was changed to 1.3. Furthermore, in order to set the platinum effective surface area to be 123 cm²·cm⁻², the platinum supporting amount was changed to 0.37 mg/cm². Except for the above, the same operation as that in the test example A1-1 was repeated to obtain the membrane electrode assembly of the example.

Test Example A3s

Fabrication of Membrane Electrode Assembly Having Electrode Catalyst Layer A3s

In order to set the average thickness of the ionomer to be 4.6 nm, the ratio (mass ratio) of the ionomer relative to the conductive support was changed to 1.3. Furthermore, in order to set the platinum effective surface area to be from 10 to 170 cm²·cm⁻², the platinum supporting amount was changed to from 0.03 to 0.48 mg/cm². Except for the above, the same operation as that in the test example A1-1 was repeated to obtain the membrane electrode assemblies of respective examples. That is, test examples A3-1, A3-2 and A3-3 are those that are included in the test example A2s.

Hereinbefore, respective test examples having the electrode catalyst layer A were explained, in which A1-1, A1-2, A1-3 and A1s correspond to Examples of the present invention and the others are Comparative Examples.

Test Example B1-1

Fabrication of Membrane Electrode Assembly Having Electrode Catalyst Layer B1-1

First, 5 mass parts of Ketjenblack having a nitrogen BET specific surface area of 718 m²/g was dispersed sufficiently in 2500 mass parts of an acid aqueous solution of platinum chloride containing 0.2 mass percent of platinum using a homogenizer. In the Ketjenblack used, a primary pore having a diameter of 10 nm or less was observed. Next, 50 mass parts of sodium citrate was added and mixed sufficiently to prepare a reaction liquid. Furthermore, using a reflux reaction apparatus, the reaction liquid was refluxed at 85° C. for 4 hours with stirring to make platinum be reduced and supported on the Ketjenblack surface. After the end of the reaction, the sample solution was cooled, left at room temperature, Ketjenblack powder supporting platinum was filtrated with a suction filtration apparatus, which was washed sufficiently with water. After that, the water-washed particle was dried at 80° C. for 6 hours under reduced pressure to obtain an electrode catalyst including platinum-supporting Ketjenblack. Meanwhile, it was checked that the ratio of the surface area of the platinum particle included in the primary pore was 50% or more.

Next, 10 mass parts of the electrode catalyst including the Ketjenblack supporting platinum, 50 mass parts of ion-exchanged water, 5 mass parts of isopropyl alcohol, and 7 mass of Nafion, which is an ionomer, were mixed. Meanwhile, as Nafion, a Nafion solution containing 5 mass percent of Nafion (manufactured by Aldrich) was used, and the ion exchange equivalent of Nafion used was 1000. Furthermore, by dispersing sufficiently these with an ultrasonic homogenizer and applying a defoaming operation under reduced pressure thereto, an electrode catalyst slurry was obtained. The ratio (mass ratio) of the ionomer relative to the conductive support was 0.7. Meanwhile, it was checked by acid-base titration that 1 g of the conductive support had 0.34 mmol of acidic functional groups.

Next, by a screen printing method, on a transfer base material including polytetrafluoroethylene (PTFE), the electrode catalyst slurry was applied so as to obtain a size of 5 cm×5 cm. After that, a heat treatment was performed at 130° C. for 30 minutes to obtain an electrode catalyst layer. The platinum supporting amount at the time was 0.21 mg/cm$^2$.

Around the both sides of the polymer electrolyte membrane, a gasket was arranged, and, on an exposed part of the both sides of the polymer electrolyte membrane, polytetrafluoroethylene on which the electrode catalyst layer was formed was furthermore arranged, and pressure of 0.8 MPa was applied to make the polymer electrolyte membrane and respective electrode catalyst layers be adhered closely. Next, the same was heated at 150° C. for 10 minutes, and each of electrode catalyst layers was assembled with the polymer electrolyte membrane by transfer to obtain a membrane electrode assembly. Meanwhile, as the polymer electrolyte membrane, Nafion NR211 having a thickness of 25 μm (manufactured by DuPont) was used. As the gasket, Teonex having a thickness of 25 μm (manufactured by Teijin DuPont) was used. Meanwhile, a thickness of an adhesion layer in the above-mentioned gasket was 10 μm. An active area of the exposed part was 5.0 cm×5.0 cm, that is, 25 cm$^2$. A platinum effective surface area in the electrode catalyst layer of the membrane electrode assembly was 100 cm$^2 \cdot$cm$^{-2}$, and the average thickness of the ionomer in the electrode catalyst layer of the membrane electrode assembly was 1.7 nm. Further, a thickness of the electrode catalyst layer of the membrane electrode assembly was 6.5 μm.

Test Example B1-2

Fabrication of Membrane Electrode Assembly Having Electrode Catalyst Layer B1-2

In order to set the platinum effective surface area to be 168 cm$^2 \cdot$cm$^{-2}$, the platinum supporting amount was changed to 0.35 mg/cm$^2$. Except for the above, the same operation as that in the test example B1-1 was repeated to obtain the membrane electrode assembly of the example.

Test Example B1s

Fabrication of Membrane Electrode Assembly Having Electrode Catalyst Layer B1s

In order to set the platinum effective surface area to be from 10 to 170 cm$^2 \cdot$cm$^{-2}$, the platinum supporting amount was changed to from 0.02 to 0.36 mg/cm$^2$. Except for the above, the same operation as that in the test example B1-1 was repeated to obtain the membrane electrode assemblies of respective examples. That is, the test examples B1-1 and B1-2 are those that are included in the test example B1s.

Test Example B2-1

Fabrication of Membrane Electrode Assembly Having Electrode Catalyst Layer B2-1

In order to set the average thickness of the ionomer to be 2.0 nm, the ratio of the ionomer (mass ratio) relative to the conductive support was changed to 0.9. Furthermore, in order to set the platinum effective surface area to be 27 cm$^2 \cdot$cm$^{-2}$, the platinum supporting amount was changed to 0.05 mg/cm$^2$. Except for the above, the same operation as that in the test example B1-1 was repeated to obtain the membrane electrode assembly of the example.

Test Example B2-2

Fabrication of Membrane Electrode Assembly Having Electrode Catalyst Layer B2-2

In order to set the average thickness of the ionomer to be 2.0 nm, the ratio of the ionomer (mass ratio) relative to the conductive support was changed to 0.9. Furthermore, in order to set the platinum effective surface area to be 65 cm$^2 \cdot$cm$^{-2}$, the platinum supporting amount was changed to 0.12 mg/cm$^2$. Except for the above, the same operation as that in the test example B1-1 was repeated to obtain the membrane electrode assembly of the example.

Test Example B2-3

Fabrication of Membrane Electrode Assembly Having Electrode Catalyst Layer B2-3

In order to set the average thickness of the ionomer to be 2.0 nm, the ratio of the ionomer (mass ratio) relative to the conductive support was changed to 0.9. Furthermore, in order to set the platinum effective surface area to be 108 cm$^2 \cdot$cm$^{-2}$, the platinum supporting amount was changed to 0.20 mg/cm$^2$. Except for the above, the same operation as that in the test example B1-1 was repeated to obtain the membrane electrode assembly of the example.

Test Example B2-4

Fabrication of Membrane Electrode Assembly Having Electrode Catalyst Layer B2-4

In order to set the average thickness of the ionomer to be 2.0 nm, the ratio of the ionomer (mass ratio) relative to the conductive support was changed to 0.9. Furthermore, in order to set the platinum effective surface area to be 172 cm$^2 \cdot$cm$^{-2}$, the platinum supporting amount was changed to 0.35 mg/cm$^2$. Except for the above, the same operation as that in the test example B1-1 was repeated to obtain the membrane electrode assembly of the example.

Test Example B2-5

Fabrication of Membrane Electrode Assembly Having Electrode Catalyst Layer B2-5

In order to set the average thickness of the ionomer to be 2.0 nm, the ratio of the ionomer (mass ratio) relative to the conductive support was changed to 0.9. Furthermore, in order to set the platinum effective surface area to be 188 cm$^2 \cdot$cm$^{-2}$, the platinum supporting amount was changed to 0.38 mg/cm$^2$. Except for the above, the same operation as that in the test example B1-1 was repeated to obtain the membrane electrode assembly of the example.

Test Example B2s, Fabrication of Membrane Electrode Assembly Having Electrode Catalyst Layer B2s In order to set the average thickness of the ionomer to be 2.0 nm, the ratio of the ionomer (mass ratio) relative to the conductive support was changed to 0.9. Furthermore, in order to set the platinum effective surface area to be from 10 to 170 $cm^2 \cdot cm^{-2}$, the platinum supporting amount was changed to from 0.02 to 0.36 $mg/cm^2$. Except for the above, the same operation as that in the test example B1-1 was repeated to obtain the membrane electrode assemblies of the respective examples. That is, the test examples B2-1, B2-2 and B2-3 are those that are included in the test example B2s.

Test Example B3s

Fabrication of Membrane Electrode Assembly Having Electrode Catalyst Layer B3s

In order to set the average thickness of the ionomer to be 2.4 nm, the ratio of the ionomer (mass ratio) relative to the conductive support was changed to 1.1. Furthermore, in order to set the platinum effective surface area to be from 10 to 170 $cm^2 \cdot cm^{-2}$, the platinum supporting amount was changed to from 0.02 to 0.36 $mg/cm^2$. Except for the above, the same operation as that in the test example B1-1 was repeated to obtain the membrane electrode assemblies of the respective examples.

Test Example B4-1

Fabrication of Membrane Electrode Assembly Having Electrode Catalyst Layer B4-1

In order to set the average thickness of the ionomer to be 3.0 nm, the ratio of the ionomer (mass ratio) relative to the conductive support was changed to 1.3. Furthermore, in order to set the platinum effective surface area to be 177 $cm^2 \cdot cm^{-2}$, the platinum supporting amount was changed to 0.36 $mg/cm^2$. Except for the above, the same operation as that in the test example B1-1 was repeated to obtain the membrane electrode assembly of the example.

Test Example B4s

Fabrication of Membrane Electrode Assembly Having Electrode Catalyst Layer B4s

In order to set the average thickness of the ionomer to be 3.0 nm, the ratio of the ionomer (mass ratio) relative to the conductive support was changed to 1.3. Furthermore, in order to set the platinum effective surface area to be from 10 to 170 $cm^2 \cdot cm^{-2}$, the platinum supporting amount was changed to from 0.02 to 0.36 $mg/cm^2$. Except for the above, the same operation as that in the test example B1-1 was repeated to obtain the membrane electrode assemblies of the respective examples.

Hereinbefore, respective test examples having the electrode catalyst layer B were explained, in which B4-1 and B4s correspond to Comparative Examples for the present invention and the others are Examples.

From FIG. 6, FIG. 7 and FIG. 8, it is recognized that the test example A1-1 and the test example A1-2 included in the range of the present invention satisfy both of an excellent transportability of gas and proton transportability even when the platinum supporting amount is reduced, as compared with other test examples lying outside the present invention. Accordingly, it is recognized that the membrane electrode assembly according to these Examples can achieve good current-voltage characteristics.

From FIG. 9, it is recognized that, when referring to the test example B3s included in the range of the present invention, the test example B2-1 to the test example B2-3 in which the average thickness of the ionomer is 2.0 nm or less satisfy both of an excellent transportability of gas and proton transportability even when the platinum supporting amount is reduced. Accordingly, it is recognized that good current-voltage characteristics can be achieved. Furthermore, it is recognized that, when referring to the test example B3s, the test example B1s having an effective surface area of platinum of 100 $cm^2 \cdot cm^{-2}$ or less and an ionomer average thickness of 1.7 nm or less more satisfy both of an excellent transportability of gas and proton transportability, even when the platinum supporting amount is reduced. Accordingly, it is recognized that good current-voltage characteristics can be achieved. This can also be supposed from the results of FIG. 10 and FIG. 11.

From the results of FIG. 12 and Table 1, it is recognized that, when the particle size distribution of the platinum is approximately uniform, the ratio of the particle number and the ratio of the surface area coincide with each other. Further, it is recognized that, event if the ratio of the surface area of metal particles contained in the primary pore of a conductive support relative to the surface area of metal particles supported by the conductive support is 50% or more, when the platinum supporting amount is reduced, both of an excellent gas transportability and proton transportability are satisfied. Accordingly, it is recognized that good current-voltage characteristics can be achieved. Further, by adopting such constitution, reduction of a contact ratio between the ionomer covering the electrode catalyst and the catalyst component, that is, the metal particle containing platinum becomes possible. Consequently, there is such an advantage that the suppression of poisoning of the catalyst component by the ionomer can be achieved.

From FIG. 13, when the thickness of the fuel cell electrode catalyst layer is 5 μm or less, the increase in proton transport resistance can be suppressed. Consequently, it is recognized that, even when the platinum supporting amount is furthermore reduced, both of an excellent gas transportability and proton transportability are satisfied to achieve good current-voltage characteristics.

From FIG. 14, it is recognized that, when the concentration of the metal particle supported of the electrode catalyst is 50 mass percent or more, by increasing the concentration of the platinum metal particle supported, the thickness of the electrode catalyst layer can be made thinner in the case where the use amount of platinum ($mg/cm^2$) is set to be the same. When the supported concentration is made high as described above, the thickness of the electrode catalyst layer can be reduced even when the amount of platinum is the same, and the reduction of transport resistance of gas such as oxygen in the secondary pore in the electrode catalyst layer becomes possible. Consequently, it is recognized that better current-voltage characteristics can be achieved.

From FIG. 15, it is recognized that, when the ion exchange equivalent of the ionomer is 800 or less, better current-voltage characteristics can be achieved. This is because further reduction of proton transport resistance becomes possible in the electrode catalyst layer.

From FIG. 16, it is recognized that, when a conductive support has 0.34 mmol or more of acidic functional groups per 1 g of the conductive support, better current-voltage characteristics can be achieved.

Hereinbefore, the content of the present invention is explained along Examples, but it is obvious to a person skilled in the art that the present invention is not limited to these description and various changes and improvements are possible. For example, configurations described in aforementioned respective embodiments and test examples are not limited to every embodiment and test example. That is, to change details of the configuration of the electrode catalyst layer, or to set the configuration of respective embodiments to be a combination other than those in respective embodiments, is considered.

According to the present invention, a fuel cell electrode catalyst layer is configured so that it is equipped with an electrode catalyst having a conductive support and a platinum-containing metal particle that is supported on the surface of the conductive support, and an ionomer covering the electrode catalyst, and that the average thickness of the ionomer is 2.4 nm or less. Consequently, even when the platinum supporting amount is reduced, such a fuel cell electrode catalyst layer, fuel cell electrode, fuel cell membrane electrode assembly and fuel cell that are capable of satisfying both of excellent gas transportability and proton transportability to achieve good current-voltage characteristics can be provided.

The invention claimed is:

1. A fuel cell electrode catalyst layer comprising:
an electrode catalyst having a conductive support and a platinum-containing metal particle that is supported on a surface of the conductive support; and
an ionomer that covers the electrode catalyst, wherein an average thickness of the ionomer is 2.4 nm or less, wherein
an average particle diameter of the platinum-containing metal particle is in a range from 1 to 30 nm,
an average particle diameter of the conductive support is in a range from 5 to 200 nm,
an effective surface area of platinum in the platinum-containing metal particle is is 5 cm$^2$·cm$^{-2}$ or more to 120 cm$^2$·cm$^{-2}$ or less, and
wherein the effective surface area of the platinum is represented by formula:

$$S_{pt}^{eff} = m \times s^{eff},$$

where m is an amount of platinum contained in a fuel cell electrode catalyst layer in mg$_{pt}$·cm$^{-2}$ and S$^{eff}$ is an electrochemical surface area of the platinum in m$^2$·g$_{pt}^{-1}$,
the conductive support has a primary pore having a diameter of 10 nm or less, and
a ratio of a surface area of the platinum-containing metal particle contained in the primary pore of the conductive support relative to a surface area of the platinum-containing metal particle supported by the conductive support is 50% or more.

2. The fuel cell electrode catalyst layer according to claim 1, wherein the average thickness of the ionomer is 2.0 nm or less.

3. The fuel cell electrode catalyst layer according to claim 1, wherein
the effective surface area of the platinum in the platinum-containing metal particle is 100 cm$^2$·cm$^{-2}$ or less; and
the average thickness of the ionomer is 1.7 nm or less.

4. The fuel cell electrode catalyst layer according to claim 1, wherein a thickness of the fuel cell electrode catalyst layer is 5 μm or less.

5. The fuel cell electrode catalyst layer according to claim 1, wherein a concentration of the platinum-containing metal particle supported by the conductive support relative to a total amount of the electrode catalyst is 50 mass percent or more.

6. The fuel cell electrode catalyst layer according to claim 1, wherein an ion exchange equivalent of the ionomer is 800 or less.

7. The fuel cell electrode catalyst layer according to claim 1, wherein the conductive support has 0.34 mmol or more of acidic functional groups per 1 g of the conductive support.

8. A fuel cell electrode comprising the fuel cell electrode catalyst layer according to claim 1.

9. A fuel cell membrane electrode assembly comprising the fuel cell electrode according to claim 8.

10. A fuel cell comprising the fuel cell membrane electrode assembly according to claim 9.

11. A fuel cell electrode catalyst layer comprising:
an electrode catalyst having a conductive support and a platinum-containing metal particle that is supported on a surface of the conductive support; and
an ionomer that covers the electrode catalyst, wherein:
the conductive support has a primary pore having a diameter of 10 nm or less,
an average thickness of the ionomer is 2.0 nm or less,
a ratio of a surface area of the platinum-containing metal particle contained in the primary pore of the conductive support relative to a surface area of the metal particle supported by the conductive support is 50% or more,
an average particle diameter of the platinum-containing metal particle is in a range from 1 to 30 nm, and
an average particle diameter of the conductive support is in a range from 5 to 200 nm.

12. The fuel cell electrode catalyst layer according to claim 11, wherein an effective surface area of platinum in the platinum-containing metal particle is 5 cm$^2$·cm$^{-2}$ or more to 120 cm$^2$·cm$^{-2}$ or less.

* * * * *